(12) United States Patent
Tomii

(10) Patent No.: US 8,719,518 B2
(45) Date of Patent: May 6, 2014

(54) LIBRARY SYSTEM, MANAGEMENT APPARATUS, LIBRARY APPARATUS, MANAGEMENT METHOD, AND MANAGEMENT PROGRAM FOR MANAGING DATA STORAGE MEDIA

(75) Inventor: Daisuke Tomii, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 240 days.

(21) Appl. No.: 13/418,631

(22) Filed: Mar. 13, 2012

(65) Prior Publication Data

US 2012/0260266 A1 Oct. 11, 2012

(30) Foreign Application Priority Data

Apr. 5, 2011 (JP) ................................. 2011-083850

(51) Int. Cl.
*G06F 13/00* (2006.01)
(52) U.S. Cl.
USPC .......................................... 711/154; 711/165
(58) Field of Classification Search
USPC .................................................. 711/154, 165
See application file for complete search history.

(56) References Cited

U.S. PATENT DOCUMENTS

| 7,664,910 | B2 | | 2/2010 | Toshine | |
| 7,945,731 | B2 | * | 5/2011 | Tokuda et al. ................ | 711/114 |
| 8,521,978 | B2 | * | 8/2013 | Kasako ......................... | 711/165 |
| 2006/0236056 | A1 | * | 10/2006 | Nagata .......................... | 711/165 |
| 2011/0137868 | A1 | * | 6/2011 | Sasage et al. ................. | 707/655 |

FOREIGN PATENT DOCUMENTS

| JP | 2006-172400 | 6/2006 |
| JP | 2010-27189 | 2/2010 |
| JP | 2011-209901 | 10/2011 |

* cited by examiner

*Primary Examiner* — Andy Ho
(74) *Attorney, Agent, or Firm* — Fujitsu Patent Center

(57) ABSTRACT

In a library system, a library apparatus detects replacement of a first drive by a second drive. The library apparatus sends management data describing the replacement of the first drive to a management apparatus. Based on relationships between the management data and storage media accommodated in the library apparatus, the management apparatus determines which of the storage media is to become unusable for reading data or writing data or both reading and writing data. The determined storage medium is designated as a migration source medium. The management apparatus then sends a data migration command to initiate data migration from the migration source medium to another storage medium. In response, the library apparatus migrates data from the specified migration source medium to another storage medium, based on the migration source information.

10 Claims, 18 Drawing Sheets

FIG. 7

GENERATION COMPATIBILITY TABLE

|  |  | DRIVE | | | | | | | | | |
|---|---|---|---|---|---|---|---|---|---|---|---|
|  |  | LTO3 | | LTO4 | | LTO5 | | LTO6 | | LTO7 | |
|  |  | write | read | write | read | write | read | write | read | write | read |
| TAPE | LTO3 | 1 | 1 | 1 | 1 | 0 | 0 | 0 | 0 | 0 | 0 |
|  | LTO4 | 0 | 0 | 1 | 1 | 1 | 1 | 0 | 1 | 0 | 0 |
|  | LTO5 | 0 | 0 | 0 | 0 | 1 | 1 | 1 | 1 | 0 | 1 |
|  | LTO6 | 0 | 0 | 0 | 0 | 0 | 0 | 1 | 1 | 1 | 1 |
|  | LTO7 | 0 | 0 | 0 | 0 | 0 | 0 | 0 | 0 | 1 | 1 |

DRIVE MANAGEMENT TABLE 221

| LIBRARY ID | GENERATION | |
| --- | --- | --- |
| | Drive0 | Drive1 |
| Lib0 | LTO4 | LTO5 |
| Lib1 | LTO5 | LTO6 |
| Lib2 | LTO6 | LTO7 |

FIG. 9

MEDIA MANAGEMENT TABLE 231

| MEDIA MANAGEMENT ID | EXPIRATION DATE | COPY DESTINATION | USABLE DRIVE GENERATION | Lib0 | Lib1 | Lib2 | LOCATION |
|---|---|---|---|---|---|---|---|
| LTO001L4 | 2011/5/1 | LTO004L7 | LTO4, 5, 6 | Drive0, 1 | Drive0, 1 | Drive0 | Lib0(1, 1) |
| LTO002L4 | 2011/5/1 | - | LTO4, 5, 6 | Drive0, 1 | Drive0, 1 | Drive0 | Lib0(1, 2) |
| LTO003L5 | 2013/5/1 | - | LTO5, 6, 7 | Drive1 | - | Drive0, 1 | Lib1(2, 1) |
| LTO004L7 | 2015/5/1 | - | LTO7, 8, 9 | - | - | Drive1 | Lib1(2, 2) |

FIG. 10

| KEY MANAGEMENT TABLE | | | 241 |
|---|---|---|---|

| MEDIA MANAGEMENT ID | ENCRYPTION | DECRYPTION |
|---|---|---|
| LTO001L4 | E01 | D01 |
| LTO002L4 | E02 | D02 |
| LTO003L5 | E03 | D03 |
| LTO004L7 | E04 | D04 |

# LIBRARY SYSTEM, MANAGEMENT APPARATUS, LIBRARY APPARATUS, MANAGEMENT METHOD, AND MANAGEMENT PROGRAM FOR MANAGING DATA STORAGE MEDIA

CROSS-REFERENCE TO RELATED APPLICATION

This application is based upon and claims the benefit of priority of the prior Japanese Patent Application No. 2011-083850, filed on Apr. 5, 2011, the entire contents of which are incorporated herein by reference.

FIELD

The embodiments discussed herein relate to a library system, management apparatus, library apparatus, management method, and management program for managing data storage media.

BACKGROUND

Library apparatuses are used to store data in mass storage media such as magnetic tape. Storage media drives (simply "drives") are installed on a library apparatus to read data from or write data to a plurality of storage media accommodated in the apparatus. When an access request arrives from, for example, a host computer or other higher-level device, the receiving library apparatus mounts a specified storage medium on one of the drives and executes read and write operations on the mounted storage medium. In this way, the library apparatuses enable a large amount of data to be stored and managed on a plurality of mass storage media.

Such library apparatuses have the functions of managing a plurality of storage media that may conform to different standards or different versions of the same standard. For example, one proposed method manages a plurality of tape cartridges on the basis of information collected from each tape cartridge, the information indicating with which standard specifications those tape cartridges comply. Another management method is to check the installation date of each storage medium with respect to the current date, thus determining whether its quality assurance period has expired. See, for example, the following patent literature:

Japanese Laid-open Patent Publication No. 2010-27189
Japanese Laid-open Patent Publication No. 2006-172400

The drives on a library apparatus may be changed to other drives for the purpose of maintenance or upgrade.

However, replacement of drives could introduce a compatibility problem into the library apparatus; it may become difficult to read and write data in some existing storage media. Suppose, for example, new drives are designed for the latest generation of storage media while not supporting some class of older storage media. In this case, the library apparatus becomes unable to read or write such old-generation media because of their incompatibility with the new drives. The library apparatus would fall into similar difficulties in the case where some existing drives are replaced with other drives of a different standard.

SUMMARY

According to an aspect of the embodiments, there is provided a library system formed from a library apparatus and a management apparatus. The library apparatus includes a transport mechanism that transports storage media, and a drive that reads data from and writes data to a storage medium transported thereto by the transport mechanism, in response to an access request that is received. The library apparatus performs a first procedure which includes: sending, upon detection of replacement of the first drive by a second drive, management data describing the replacement of the first drive of the first drive; and migrating, in response to a data migration command containing migration source information that specifies a migration source medium, data from the specified migration source medium to another storage medium, based on the migration source information. The management apparatus performs a second procedure which includes: receiving the management data from the library apparatus; determining, based on the management data associated with the storage media in the library apparatus, which of the storage media is to become unusable for reading data or writing data or both reading and writing data, and designating the determined storage medium as the migration source medium; and sending the data migration command containing the migration source media information to the management apparatus to specify the migration source medium that is designated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example data structure of a generation compatibility table;

FIG. 8 illustrates an example data structure of a drive management table;

FIG. 9 illustrates an example data structure of a medium management table;

FIG. 10 illustrates an example data structure of a key management table;

DESCRIPTION OF EMBODIMENTS

Figure 1:
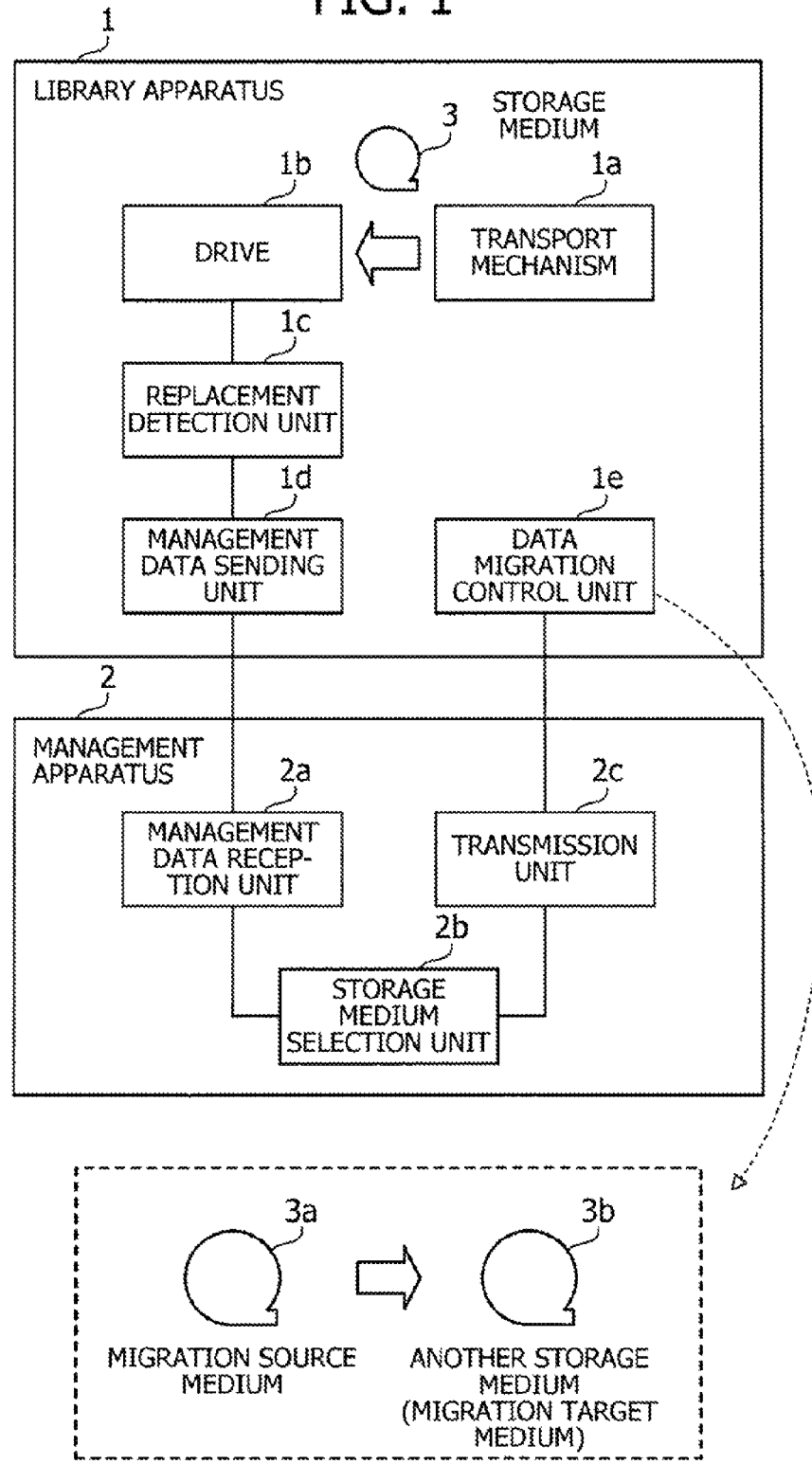
FIG. 1 illustrates a library system according to a first embodiment.

Several embodiments will be described below with reference to the accompanying drawings, wherein like reference numerals refer to like elements throughout.

(a) First Embodiment

FIG. 1 illustrates a library system according to a first embodiment. The illustrated library system is formed from a library apparatus 1 and a management apparatus 2. The library apparatus 1 accommodates a plurality of storage media 3. For example, the library apparatus 1 has a storage rack (not illustrated) to store a plurality of storage media 3. According to the first embodiment, the library apparatus 1 includes a transport mechanism 1a, a drive 1b, a replacement detection unit 1c, a management data sending unit 1d, and a data migration control unit 1e.

The transport mechanism 1a takes a storage medium 3 out of the storage rack and transports and loads it on to the drive 1b. The transport mechanism 1a also unloads the storage medium 3 from the drive 1b and transports and places it back to the storage rack.

The drive 1b reads data out of the storage medium 3 or writes data into the storage medium 3 in response to read and write requests that are received. Read and write requests may be issued by, for example, a host computer (not illustrated) and delivered to the library system through a link. The library apparatus 1 may have a plurality of such drives 1b.

The replacement detection unit 1c detects replacement of the drive 1b by another drive. Upon detection of replacement, the management data sending unit 1d sends management data describing the replacement of the drive 1b.

The data migration control unit 1e is responsive to a data migration command containing migration source information that specifies which storage medium is to be replaced. Here the specified storage medium 3a is referred to as a "migration source medium." Upon receipt of this data migration command, the data migration control unit 1e executes data migration from the migration source medium 3a to another storage medium 3b according to the migration source information. For example, the data migration control unit 1e may manipulate the aforementioned transport mechanism 1a to load the migration source medium 3a and another storage medium 3b for data migration. More specifically, the data migration control unit 1e may cause the drive 1b and some other drive to read data out of the migration source medium 3a and write that data into another storage medium 3b.

The management apparatus 2, on the other hand, includes a management data reception unit 2a, a storage medium selection unit 2b, and a transmission unit 2c. The management data reception unit 2a receives management data (not illustrated) from the library apparatus 1. The storage medium selection unit 2b determines which storage medium in the library apparatus 1 is to become unusable as a result of replacement of drives. Here the wording "become unusable" is used herein to mean that it becomes impossible to read or write, or both read and write data in a particular storage medium. Such storage media are thus referred to as "unusable media." The storage medium selection unit 2b makes this determination on the basis of relationships between the management data and storage media accommodated in the library apparatus 1, and designates the determined storage medium as a migration source medium 3a. For example, a storage medium may become unusable when an existing drive is replaced with a new-generation drive that does not support read access to some existing generation(s) of storage media. The same applies also when an existing drive is replaced with another drive whose read and write interface is based on some different standard.

The transmission unit 2c transmits a data migration command to the library apparatus 1 when there is a migration source medium 3a that needs data migration. This data migration command includes migration source media information specifying the migration source medium 3a.

In operation of the above-described library system, the drive 1b performs read and write operations on a storage medium 3 according to received read and write requests. When the drive 1b has been replaced or to be replaced with another drive, the replacement detection unit 1c detects that replacement event and thus causes the management data sending unit 1d to send management data of the drive 1b and the replacement drive. The management data reception unit 2a receives this management data and passes it to the storage medium selection unit 2b. The storage medium selection unit 2b then determines which storage medium in the library apparatus 1 is expected to become unusable in terms of reading or writing, or both reading and writing of stored data, based on relationships between the management data and storage media. When a specific storage medium is found to become unusable and thus designated as a migration source medium 3a, the transmission unit 2c sends a data migration command containing migration source information that specifies the designated migration source medium 3a. Upon receipt of this data migration command, the data migration control unit 1e executes data migration according to the migration source information contained in the received data migration command. The data stored in the migration source medium 3a is thus moved to another storage medium 3b.

As can be seen from the above, the proposed library system performs data migration from existing storage media to other media before the stored data become inaccessible due to replacement of drives. Specifically, when a storage medium is found to become unusable as a result of replacement of drives, the library system moves data in that storage medium to another storage medium 3b. The data migration ensures retrieval (reading) of the existing data even when the drives are changed. The ensured data retrieval also means that the data may be updated after retrieval. That is, the library system ensures update (writing) of the existing data in the storage media.

The library system may encrypt data when storing it in a storage medium. The management apparatus 2 may be configured to manage the cryptographic keys used for that purpose. When this is the case, the transmission unit 2c is configured to send appropriate cryptographic keys to the data migration control unit 1e for use in processing data in the migration source medium 3a. The data migration control unit 1e executes data migration, using the received keys to manipulate encrypted data in the migration source medium 3a.

The library apparatus 1 may be configured to restrict replacement of drives during a data migration process. Suppose, for example, that an existing drive has already been replaced by another drive, while there is a migration source medium 3a that needs data migration. The drive 1b in FIG. 1 represents the installed new drive. In this case, the library apparatus 1 may inform the user that the original drive has to be reinstalled in place of the drive 1b for the purpose of data migration. The library apparatus 1 executes data migration by using the reinstalled original drive, while restricting replacement of drives.

In another example case, the original drive still sits in its place, while there is a migration source medium 3a that needs data migration before the drive is replaced. The drive 1b in FIG. 1 represents this original drive. The library apparatus 1 suspends replacement of the drive 1b to execute data migration with that drive 1b.

The next section will describe a more specific example in which the above-described library apparatus 1 and management apparatus 2 are applied to a library system used for backup and restoration of data.

(b) Second Embodiment

Figure 2:
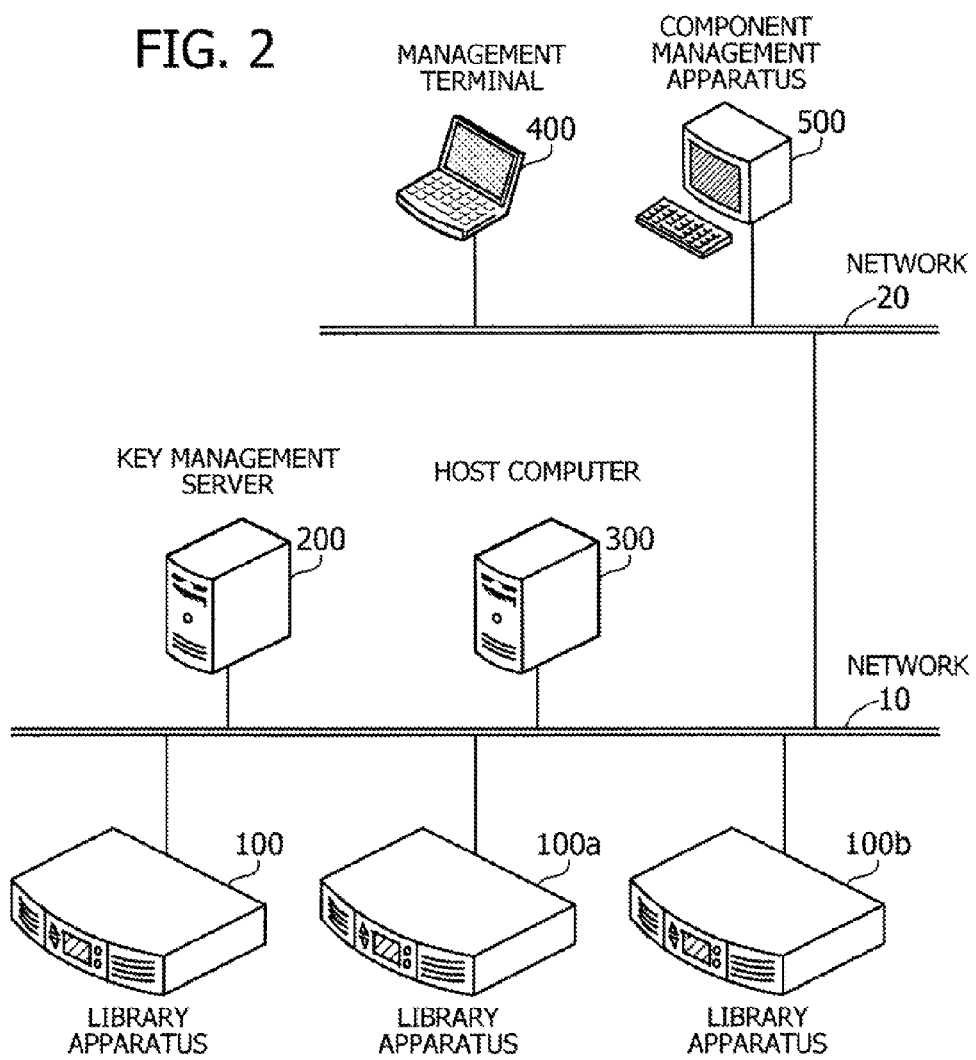
FIG. 2 illustrates an overall structure of a library system according to a second embodiment.

FIG. 2 illustrates an overall structure of a library system according to a second embodiment. The illustrated library system is formed from a plurality of library apparatuses 100, 100a, and 100b, a key management server 200, a host computer 300, a management terminal 400, and a component management apparatus 500. The library apparatuses 100, 100a, and 100b, key management server 200, and host computer 300 are linked to each other via a network 10. The management terminal 400 and component management apparatus 500 are linked to each other via another network 20. The two networks 10 and 20 are also linked together via an intermediate device (not illustrated). Accordingly, all devices on those networks 10 and 20 may be able to communicate with each other.

Specifically, the library apparatuses 100, 100a, and 100b are tape library apparatuses each accommodating a plurality of magnetic tape reels or cartridges as data storage media. The following explanation assumes magnetic tape media that comply with the Linear Tape-Open (LTO, registered trademark) standard published as Ultrium (registered trademark). It is not intended, however, to limit the second embodiment with that specific type of magnetic tape media. The second embodiment may also be used with other types of magnetic tape such as Digital Linear Tape (DLT, registered trademark), Advanced Intelligent Tape (AIT, registered trademark), and Digital Data Storage (DDS, registered trademark). The library apparatuses 100, 100a, and 100b may also be known as magnetic tape changers.

The LTO standard has been evolving for larger storage capacities, and some different generations of LTO drives and tape media are available in the market. The generations of LTO are designated by a combination of the leading character string of "LTO" and a number representing a specific generation. For example, LTO1 is the first generation of LTO standard. Similarly LTO2 is the second generation. The greater the number, the newer the LTO generation. A newer generation offers larger data capacities and higher data speeds. LTO4 and subsequent generations support encryption of stored data. A new LTO standard emerges every other year, for example. When new-generation drives are released, old drives are then phased out of the market in about six months.

While the illustrated library apparatuses 100, 100a, and 100b use magnetic tape as their storage media, the second embodiment is not limited by that specific type of media. For example, the library apparatuses 100, 100a, and 100b may be configured to use Compact Disc Rewritable (CD-RW), Digital Versatile Disc Rewritable (DVD-RW), DVD-Random Access Memory (DVD-RAM), or other types of optical disc media. The library apparatuses 100, 100a, and 100b may also be configured to use magnetic disk media such as hard disk drives (HDD) or large-capacity semiconductor memory devices, for example.

The key management server 200 is an information processing apparatus configured to supervise the library apparatuses 100, 100a, and 100b. Specifically, the key management server 200 manages cryptographic keys for use by the library apparatuses 100, 100a, and 100b to encrypt or decrypt data when it is written to or read out of a magnetic tape medium. The key management server 200 may also manage the library apparatuses 100, 100a, and 100b in terms of their hardware resources. The key management server 200 may further generate alerts and instructions to the user of the library system, depending on the events that may happen in the library apparatuses 100, 100a, and 100b. Such user notification may be realized by sending commands from the key management server 200 to the library apparatuses 100, 100a, and 100b or management terminal 400 so that messages from the key management server 200 are displayed on their screen.

The host computer 300 is an information processing apparatus configured to provide data backup and restoration functions by executing application programs encoded therefor. In backup operation, the host computer 300 retrieves data stored in itself or in another apparatus coupled thereto and makes a backup copy of the retrieved data in storage media in the library apparatuses 100, 100a, and 100b. In restore operation, the host computer 300 retrieves the backup data from the library apparatuses 100, 100a, and 100b and restores the retrieved data in itself or other apparatus in which the data was originally stored.

The management terminal 400 is an information processing apparatus operated by a user of the library system. The management terminal 400 may display information (e.g., alerts) sent from the key management server 200.

The component management apparatus 500 is an information processing apparatus for managing hardware resources used in the library system. Specifically, the component management apparatus 500 manages the stock of spare hardware components, which may be used for replacement in case of hardware failure of some component in the library apparatuses 100, 100a, and 100b. Those spare components may be stocked in, for example, a warehouse of a parts center. Particularly the components under control of the component management apparatus 500 include drives used in the library apparatuses 100, 100a, and 100b. More specifically, the component management apparatus 500 has a table in which the drives of various generations are registered together with their inventory (i.e., the number of stocks).

The structure of a library apparatus 100 will now be described below. It is noted that the following description also applies to the other library apparatuses 100a and 100b.

Figure 3:
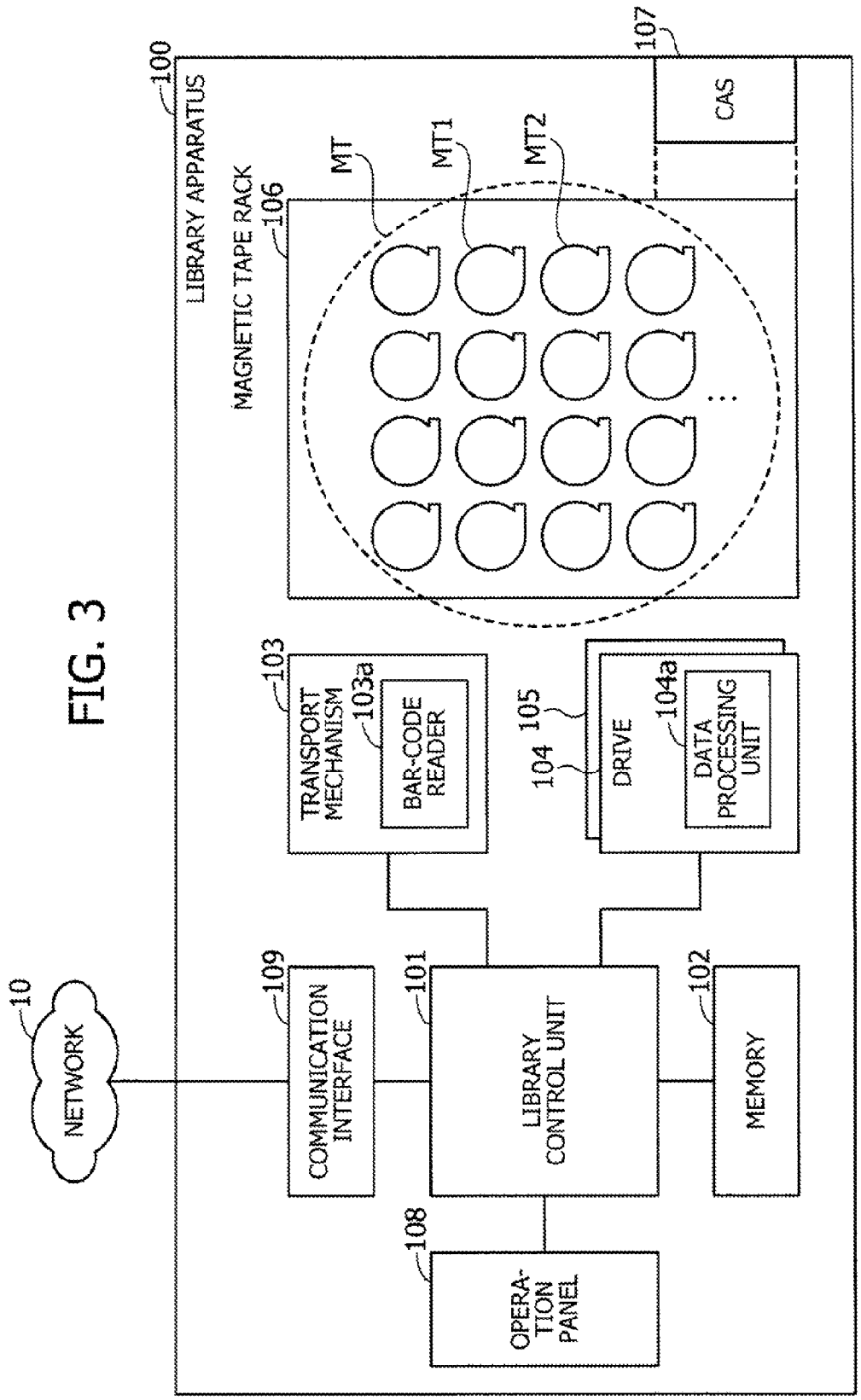
FIG. 3 illustrates an example hardware configuration of a library apparatus according to the second embodiment.

FIG. 3 illustrates an example hardware configuration of a library apparatus according to the second embodiment. The illustrated library apparatus 100 includes a library control unit 101, a memory 102, a transport mechanism 103, drives 104 and 105, a magnetic tape rack 106, a cartridge access station (CAS) 107, an operation panel 108, and a communication interface 109.

The library control unit 101 executes programs stored in the memory 102 to control the library apparatus 100 as a whole. Particularly the library control unit 101 manages information about magnetic tape media accommodated in the magnetic tape rack 106. The memory 102 is where the programs implementing various functions of the library apparatus 100 are stored. The memory 102 also stores various data objects that the library control unit 101 uses in its processing.

The transport mechanism 103 transports magnetic tape media from the drives 104 and 105 to the magnetic tape rack 106, and vice versa, according to commands from the library control unit 101. Specifically, the transport mechanism 103 takes a magnetic tape medium out of the magnetic tape rack 106 and loads it on to one of the two drives 104 and 105. The transport mechanism 103 also unload a magnetic tape medium from the drives 104 and 105 and transports it back to the magnetic tape rack 106. The transport mechanism 103 may be equipped with a bar-code reader 103*a*. The bar-code reader 103*a* reads a bar code attached to a magnetic tape medium to obtain its identifier and other information including the generation of the medium.

When the library apparatus 100 starts up, the transport mechanism 103 scans the current set of magnetic tape media in the magnetic tape rack 106 by using its bar-code reader 103*a*. The transport mechanism 103 also performs a bar code scan when a new magnetic tape medium is inserted, or any time the user commands to do so. Specifically the transport mechanism 103 checks the presence of magnetic tape media by reading their bar codes and sends the check result information to the library control unit 101. The library control unit 101 uses the received information to produce or update data for management of the magnetic tape media.

The drives 104 and 105 read data from and write data to magnetic tape media. The drive 104 includes a data processing unit 104*a*. This data processing unit 104*a* obtains cryptographic keys from the key management server 200 and performs a cryptographic operation on the data stored or to be stored in a magnetic tape medium by using the obtained keys. For example, the data processing unit 104*a* may encrypt data with a key before recording the data on a magnetic tape medium. Also the data processing unit 104*a* may decrypt data with a key when it is read out of a magnetic tape medium. The cryptographic operation may use different keys for encryption and decryption as in the public key cryptography or a single key for both encryption and decryption as in the common key cryptography. The other drive 105 seen in FIG. 3 is similar to the drive 104 described above. These two drives 104 and 105 may, however, belong to different product generations.

The magnetic tape rack 106 houses a collection of magnetic tape media, including those labeled "MT1" and "MT2." The magnetic storage media in the magnetic tape rack 106 may be referred to collectively as a "magnetic tape array" MT. While the following section will describe one magnetic tape medium MT1, it should be appreciated that the same description similarly applies to MT2 and other magnetic tape media. Those magnetic tape media may, however, belong to different product generations.

Magnetic tape medium MT1 is placed at a specific location in the magnetic tape rack 106. A non-contact IC tag may be attached to magnetic tape MT1 to record its mounting history, the amount of stored data, error statistics, and the like. Also attached to magnetic tape MT1 is a bar code label, which has been produced according to prescribed naming rules. The location of magnetic tape medium MT1 is fixed in the magnetic tape rack 106. That is, magnetic tape medium MT1 is returned to its original location after being used with a drive.

The CAS 107 is an entrance to the magnetic tape rack 106 through which magnetic tape media are entered. When a magnetic tape medium arrives, the CAS 107 detects it and informs the library control unit 101 of that event.

The operation panel 108 has a touchscreen to provide graphical user interface (GUI) for the user to interact with the library apparatus 100. The touchscreen displays information to the user and accepts inputs that the user gives by touching the screen. The operation panel 108 may also have some buttons or switches for the user to enter particular commands to the library apparatus 100. Information displayed on the operation panel 108 allows the user to see the condition of the library apparatus 100. The user may also command the server communication unit 110 to perform a specific operation by touching the screen or pressing buttons on the operation panel 108.

The communication interface 109 is connected to a network 10. Via this network 10, the communication interface 109 communicates with other computers including the key management server 200 and host computer 300.

Figure 4:
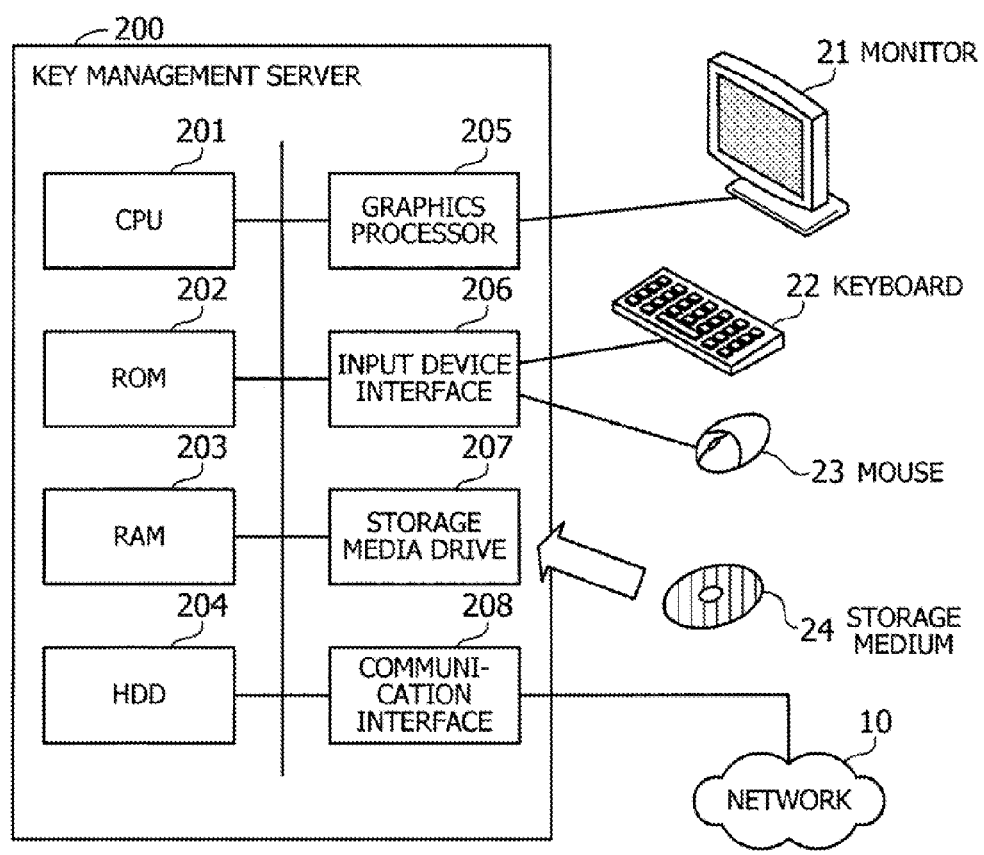
FIG. 4 illustrates an example hardware configuration of a key management server according to the second embodiment.

FIG. 4 illustrates an example hardware configuration of a key management server according to the second embodiment. The illustrated key management server 200 is formed from a central processing unit (CPU) 201, a read-only memory (ROM) 202, a random access memory (RAM) 203, a hard disk drive (HDD) 204, a graphics processor 205, an input device interface 206, a storage media drive 207, and a communication interface 208. It is noted that this hardware configuration of the key management server 200 similarly applies to the host computer 300, management terminal 400, component management apparatus 500, and key management server 200.

The CPU 201 controls the key management server 200 as a whole. The ROM 202 stores, for example, basic input and output system (BIOS) programs of the key management server 200. The RAM 203 is used to temporarily store the whole or part of operating system (OS) programs and application programs that the CPU 201 executes, in addition to other various data objects that it manipulates at runtime. The HDD 204 stores operating system program files and application program files. The HDD 204 also stores various data objects that the CPU 201 manipulates at runtime. Solid state drives (SSD) or other type of non-volatile storage devices may be used in place of, or together with the HDD 204.

The graphics processor 205 is coupled to a monitor 21 and produces video images in accordance with drawing commands from the CPU 201 and displays them on a screen of the monitor 21. The input device interface 206 is coupled to a keyboard 22 and a mouse 23 and supplies signals from those devices to the CPU 201. The storage media drive 207 is a device used to read data stored in a storage medium 24. For example, the functions that the key management server 200 is supposed to provide may be encoded as computer programs to be run on a computer system. These programs may be recorded on a computer-readable, non-transitory storage medium 24 for the purpose of distribution.

The storage medium 24 may be, for example, a magnetic storage device, optical disc, magneto-optical storage medium, or semiconductor memory device. Magnetic storage devices include hard disk drives (HDD), flexible disks (FD), and magnetic tape, for example. The optical discs include, for example, compact disc (CD), CD-Recordable (CD-R), CD-Rewritable (CD-RW), digital versatile disc (DVD), DVD-R, DVD-RW, and DVD-RAM. Magneto-optical storage media include magneto-optical discs (MO), for example. Semiconductor memory devices include flash memory devices such as USB memory.

It is also possible to store the programs in a program distribution server (not illustrated) on the network 10. When this is the case, the key management server 200 downloads necessary programs from the program distribution server over the network 10.

The communication interface 208 is connected to the network 10 to communicate with other devices, including the library apparatuses 100, 100*a*, and 100*b*, host computer 300, management terminal 400, and component management apparatus 500.

Figure 5:
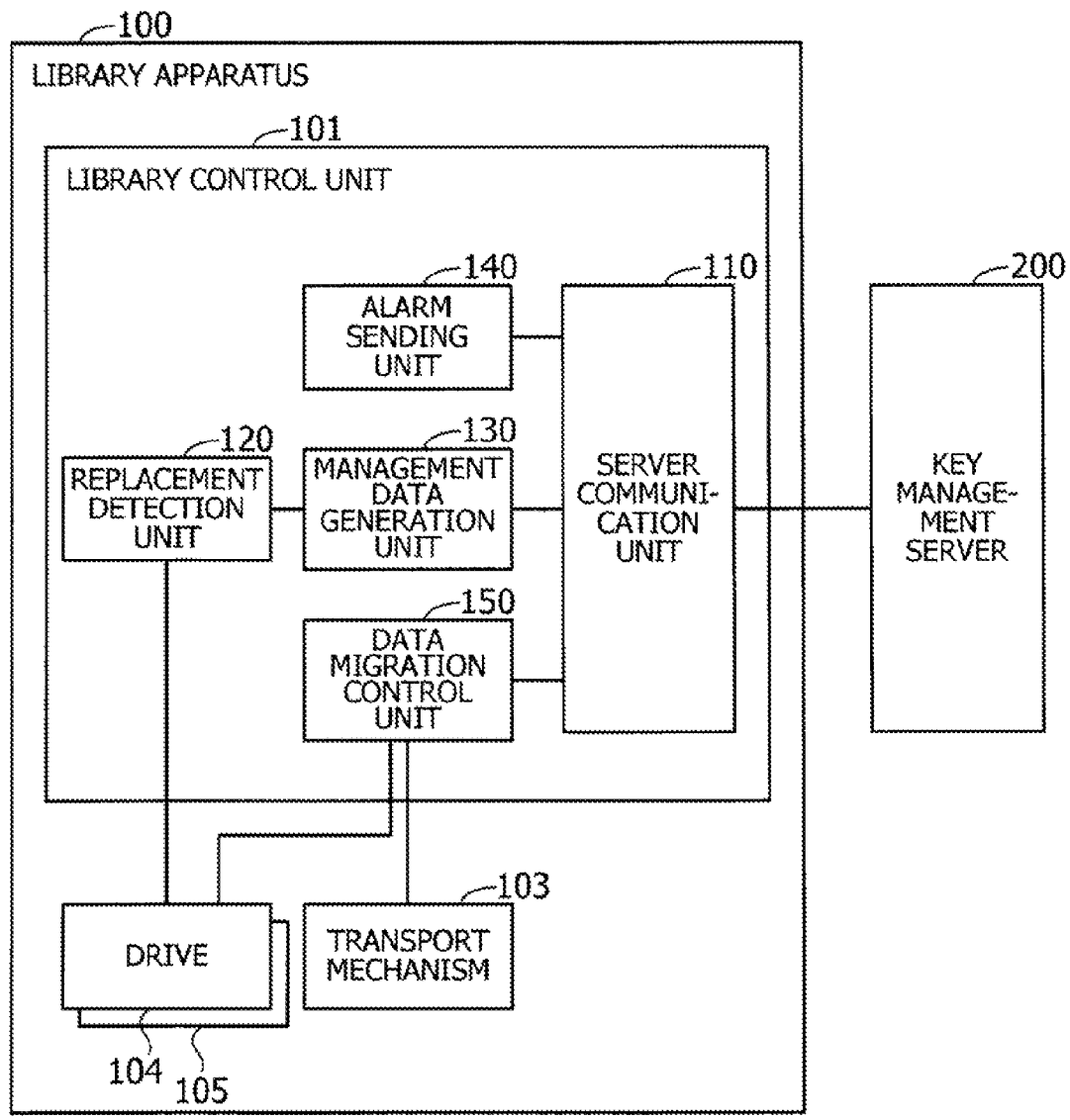
FIG. 5 is a functional block diagram of the library apparatus according to the second embodiment.

FIG. 5 is a functional block diagram of the library apparatus 100 according to the second embodiment. The illustrated library apparatus 100 includes a server communication unit 110, a replacement detection unit 120, a management data generation unit 130, an alarm sending unit 140, and a data migration control unit 150. The functions of those components may be implemented on the library apparatus 100 as a computer program(s) executed by the library control unit 101. It may also be possible to implement the whole or part of these functions with dedicated hardware components.

Referring to FIG. 5, the server communication unit 110 communicates with the key management server 200. The replacement detection unit 120 detects replacement of one or more of the drives 104 and 105. Suppose, for example, that the drive 104 is a new drive that has replaced the original drive. Upon detection of this replacement, the replacement detection unit 120 sends information describing the new drive 104 to the management data generation unit 130. The information includes a value indicating the generation of the new drive 104. The management data generation unit 130 produces management data based on the information received from the replacement detection unit 120, and passes it to the server communication unit 110 for delivery to the key management server 200.

The alarm sending unit 140 is configured to issue an alarm when the library apparatus 100 encounters a failure. Specifically, the alarm sending unit 140 issues an alarm to the user when it is raised by the key management server 200. For example, the key management server 200 may manage the expiration date of each magnetic tape medium as will be described later. The key management server 200 signals the alarm sending unit 140 when it is found that the expiration date of a particular magnetic tape medium is approaching. In response, the alarm sending unit 140 raises an alarm to the user by using, for example, one or more of the following methods: (a) displaying a relevant message on a screen of the operation panel 108 or management terminal 400, (b) sending an alarm to the key management server 200, and other computers as necessary, by using the Simple Network Management Protocol (SNMP), and (c) causing the key management server 200 to send a prepared e-mail message to registered users.

The data migration control unit 150 controls data migration from an existing magnetic tape medium to another magnetic tape medium according to commands from the key management server 200. For example, the data migration control unit 150 performs data migration from one magnetic tape medium MT2 to another magnetic tape medium MT1 by controlling the transport mechanism 103 to use one or both of the two drives 104 and 105. More specifically, the data migration control unit 150 first saves the data on the source magnetic tape medium MT2 to some hard disk drives in the host computer 300 and then transfers the saved data to the target magnetic tape medium MT1. This data migration process may be executed by an application on the host computer 300, under the control of the key management server 200.

Figure 6:
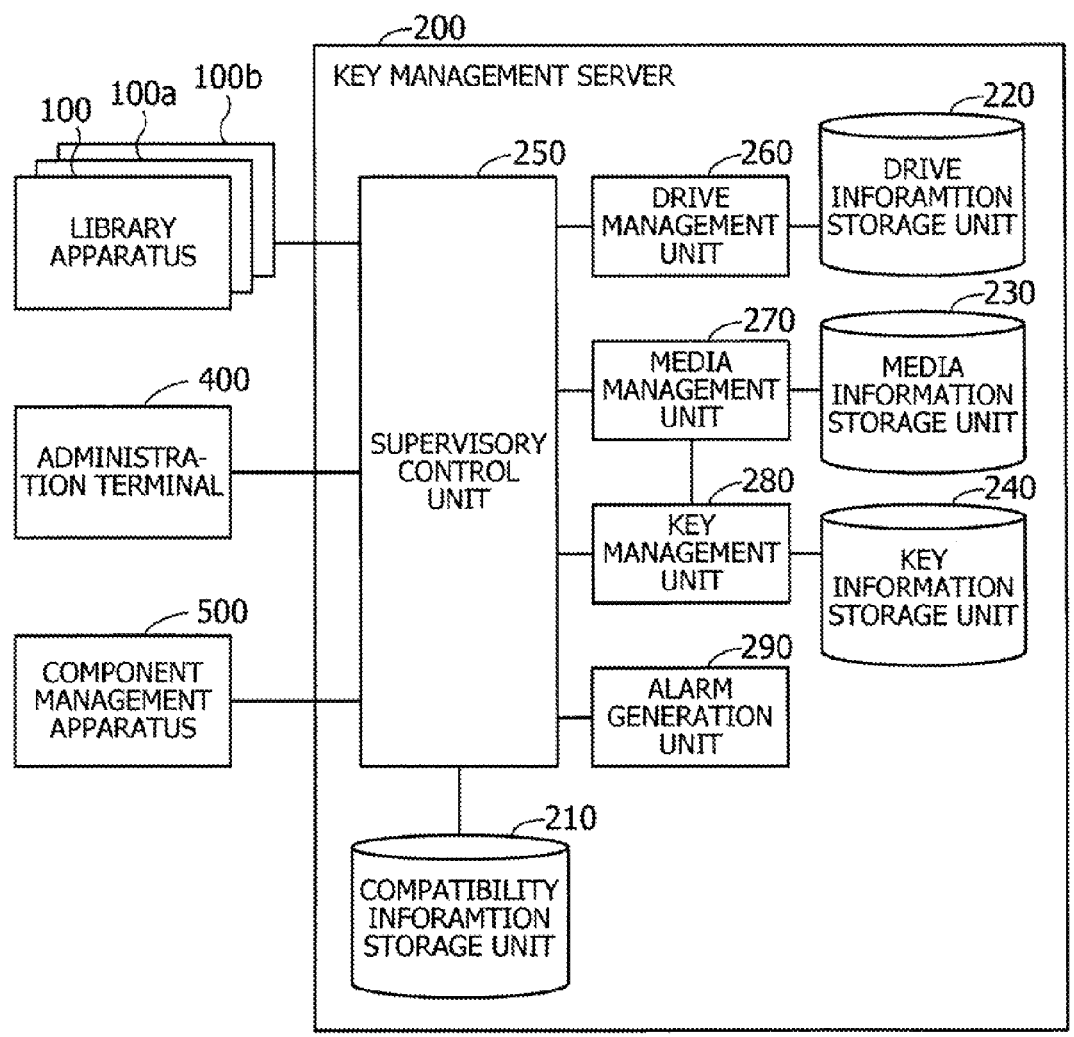
FIG. 6 is a functional block diagram of the key management server according to the second embodiment.

FIG. 6 is a functional block diagram of the key management server according to the second embodiment. The illustrated key management server 200 includes a compatibility information storage unit 210, a drive information storage unit 220, a media information storage unit 230, a key information storage unit 240, a supervisory control unit 250, a drive management unit 260, a media management unit 270, a key management unit 280, and an alarm generation unit 290. The functions of these components may be implemented on the key management server 200 as a computer program(s) executed by the CPU 201. It may also be possible to implement the whole or part of these functions with dedicated hardware components.

The compatibility information storage unit 210 stores compatibility information including a generation compatibility table. The generation compatibility table is a collection of data items for managing the generations of drives, as well as the generations of magnetic tape media supported by each generation of drives.

The drive information storage unit 220 stores drive information including a drive management table. The drive management table is a collection of data items for managing the drives installed in library apparatuses 100, 100a, and 100b, as well as their respective generations.

The media information storage unit 230 stores media information including a media management table. The media management table is a collection of data items for managing information about each individual magnetic tape medium.

The key information storage unit 240 stores key data including a key management table. The key management table is a collection of data items for managing cryptographic keys used to encrypt and decrypt data records in magnetic tape media.

The supervisory control unit 250 communicates with the library apparatuses 100, 100a, and 100b, management terminal 400, and component management apparatus 500. For example, the supervisory control unit 250 receives management data from the library apparatuses 100, 100a, and 100b. Upon receipt, the supervisory control unit 250 executes various control operations to execute replacement of drives by communicating with the drive management unit 260, media management unit 270, key management unit 280, alarm generation unit 290, management terminal 400, and component management apparatus 500. More specifically, the supervisory control unit 250 identifies what drives and magnetic tape media are used in the library apparatuses 100, 100a, and 100b and determines the necessity of data migration, based on the number of drives of each generation and the number of magnetic tape media of each generation, and with reference to the compatibility information storage unit 210. Then, to initiate data migration, the supervisory control unit 250 generates and sends a data migration command to relevant library apparatuses 100, 100a, and 100b. The supervisory control unit 250 also forwards alarm information from the alarm generation unit 290 to the library apparatuses 100, 100a, and 100b and management terminal 400.

The drive management unit 260 manages the drives installed in each library apparatus 100, 100a, and 100b. For example, the drive management unit 260 may receive a query from the supervisory control unit 250. In response, the drive management unit 260 obtains the number of drives of each generation by consulting the drive information storage unit 220 and sends that information back to the supervisory control unit 250.

The media management unit 270 manages the magnetic tape media accommodated in each library apparatus 100, 100a, and 100b. For example, the media management unit 270 may receive a query from the supervisory control unit 250. In response, the media management unit 270 obtains the number of magnetic tape media of each generation by consulting the media information storage unit 230 and sends that information back to the supervisory control unit 250.

The key management unit 280 manages cryptographic keys that the drives in the library apparatuses 100, 100a, and 100b may use when writing and reading data in encrypted form. For example, the key management unit 280 may receive a query about specific drives from the supervisory control unit 250. In response, the key management unit 280 retrieves pertinent keys for the specified drives and sends them back to the supervisory control unit 250.

The alarm generation unit 290 produces an alarm according to commands from the supervisory control unit 250 and sends it to the supervisory control unit 250.

FIG. 7 illustrates an example data structure of the generation compatibility table 211 stored in the compatibility information storage unit 210. The illustrated generation compatibility table 211 is formed from a data field related to tape media and those related to drives. The data values horizontally arranged in this generation compatibility table 211 are associated with each other to constitute a record describing a specific storage medium.

The generation compatibility table 211 provides information on downward compatibility of drives and media in the case of LTO. It is assumed here that the drives of each generation is capable of both reading and writing magnetic tape media of the same generation, as well as one generation older, but only supports read operation when the medium is two generations older. It is also assumed that the drives can neither read nor write data when the medium is three or more generations older than the drive.

The generation compatibility table 211 contains a value of "1" in each data field labeled "write" when the corresponding combination of a magnetic tape medium and drive allows writing data. The generation compatibility table 211, on the other hand, indicates a value of "0" in the same "write" field when write operation is not possible in that combination of a magnetic tape medium and a drive. Similarly, the generation compatibility table 211 contains a value of "1" in the data field labeled "read" when the corresponding combination of a magnetic tape medium and a drive allows reading data. The generation compatibility table 211, on the other hand, indicates a value of "0" in the same "read" field when read operation is not possible in that combination of a magnetic tape medium and a drive.

For example, the LTO3 drive is capable of reading and writing LTO3 magnetic tape media since their generations match with each other. Accordingly, the generation compatibility table 211 indicates "1" in both the "write" and "read" data fields. For another example, the LTO5 drive can read, but cannot write LTO3 magnetic tape media since those media are two generations older than the drive. Accordingly, the generation compatibility table 211 indicates "1" for "read" and "0" for "write." For yet another example, the LTO3 drive can neither read nor write LTO4 magnetic tape media since those media are newer than the drive in terms of the LTO generations. Accordingly, the generation compatibility table 211 indicates "0" for both "read" and "write."

FIG. 8 illustrates an example data structure of the drive management table 221 stored in the drive information storage unit 220. The illustrated drive management table 221 is formed from data fields titled "Library Identifier (ID)" and "Generation." The data values horizontally arranged in this drive management table 221 are associated with each other to constitute a record describing drives installed in a specific library.

The library ID field contains an identifier that indicates a specific library. In the present example, it is assumed that the library apparatus 100 (FIGS. 2 and 6) has a library ID of "Lib0." Similarly the library apparatus 100a has a library ID of "Lib1," and the library apparatus 100b has a library ID of "Lib2." The generation field indicates the generation of each drive installed in the corresponding library. It is assumed in the present example that each library apparatus 100, 100a, and 100b has two drives designated by the names "Drive0" and "Drive1." The embodiments are, however, not limited by this specific quantity of drives. The library apparatuses may only have one drive or may have three or more drives. It is also possible that different library apparatuses have different numbers of drives.

For example, the drive management table 221 illustrated in FIG. 8 contains a record describing one library identified by library ID "Lib0," and this record indicates a generation "LTO4" for one drive "Drive0" and a generation "LTO5" for another drive "Drive1." This means that the drive "Drive0" in the library apparatus 100 belongs to the fourth generation of LTO, while the drive "Drive1" in the same belongs to the fifth generation of LTO.

FIG. 9 illustrates an example data structure of the media management table 231 stored in the media information storage unit 230. The illustrated media management table 231 is formed from a plurality of data fields titled as follows: "Media Management ID," "Expiration Date," "Copy Destination," "Usable Drive Generation," "Lib0," "Lib1," "Lib2," and "Location." The data values horizontally arranged in this media management table 231 are associated with each other to constitute a record describing a specific storage medium.

The media management ID field contains an identifier that indicates a specific magnetic tape medium, and the expiration date field indicates its expiration date, i.e., until when that magnetic tape medium (referred to herein as the "pertinent magnetic tape medium") is warranted to offer its specified quality. This expiration date may be determined from, for example, expected age deterioration of the pertinent magnetic tape medium due to the changes in chemical properties of the materials, contamination, and the like. The copy destination field stores an identifier indicating another magnetic tape medium to which the data in the pertinent magnetic tape medium will be copied for data migration. The usable drive generation field indicates which generations of drives are compatible with the pertinent magnetic tape medium. The Lib0 field specifically indicates which drives in one library apparatus 100 is compatible with the pertinent magnetic tape medium. The Lib1 field indicates which drives in another library apparatus 100a is compatible with the pertinent magnetic tape medium. The Lib2 field indicates which drives in yet another library apparatus 100b is compatible with the pertinent magnetic tape medium. The location field indicates where in the magnetic tape rack 106 the pertinent magnetic tape medium is accommodated. For example, the location may be represented as two-dimensional coordinates.

For example, the topmost record of the illustrated media management table 231 contains "LTO001L4" in its media management ID field, "2011/5/1" in its expiration date field, "LTO004L7" in its copy destination field, "LTO4, 5, 6" in its usable drive generation field, "Drive0, 1" in its Lib0 field, "Drive0, 1" in its Lib1 field, "Drive0" in its Lib2 field, and "Lib0(1, 1)" in its location field. This record means that the magnetic tape medium managed with a media management ID "LTO001L4" will reach its expiration date on May 1, 2011, while the stored data has already been copied to another magnetic tape medium "LTO004L7." As seen in this example, each media management ID ends with a specific number (e.g., "4" or "7"), subsequent to the second instance of character "L." This number represents the generation of the magnetic tape medium. For example, "LTO001L4" indicates that the medium belongs to the fourth generation, and "LTO004L7" the seventh generation. The topmost record then indicates that the pertinent magnetic tape medium can be read by using a drive of the fourth, fifth, or sixth generation. It is also indicated that one library apparatus 100 (Lib0) has two drives, Drive0 and Drive1, that are at least capable of reading data from the pertinent magnetic tape medium. Another library apparatus 100a (Lib1) similarly has two such drives, Drive0 and Drive1, and yet another library apparatus 100b (Lib2) has one such drive, Drive0. It is further indicated that the pertinent magnetic tape medium has its home location "(1, 1)" in the library apparatus 100 (Lib0), the location being represented in the coordinates of a specific rack position.

As also seen in FIG. 9, the media management table 231 may contain, for example, a hyphen ("-") in the copy destination field. This hyphen indicates that data migration has not been performed. The media management table 231 also contains a hyphen in, for example, the Lib0 field to indicate that the library apparatus 100 has no appropriate drives for reading data out of the pertinent magnetic tape medium. This usage of hyphens applies similarly to the Lib1 and Lib2 fields.

FIG. 10 illustrates an example data structure of a key management table. The illustrated key management table 241 is formed from three data fields titled as follows: "Media Management ID," "Encryption," and "Decoding." The data values horizontally arranged in this key management table 241 are associated with each other to constitute a record describing a specific storage medium.

The media management ID field contains an identifier that indicates a specific magnetic tape medium. The encryption field contains a key that is used to encrypt data before it is written in the pertinent magnetic tape medium. The decryption field contains a key that is used to decrypt data that is read out of the pertinent magnetic tape medium.

For example, the topmost record in this key management table 241 contains "LTO001L4" in the media management ID field, "E01" in the encryption field, and "D01" in the decryption field. This means that a key named "E01" is to be used to encrypt data when it is written in a pertinent magnetic tape medium that is identified by a media management ID "LTO001L4." The record also means that another key "D01" is to be used to decrypt data read out of the same magnetic tape medium.

While the above-described example uses different keys for encryption and decryption, the present embodiment may be configured to use a common key for both encryption and decryption. It is also noted that the present embodiment may be modified to read and write data without using cryptographic operation.

The following section will now discuss detailed procedures executed by the above-described library system, beginning with a generation check procedure which is performed when a magnetic tape medium is loaded on to a library apparatus 100. It is assumed in the following description that magnetic tape medium MT1 is newer than magnetic tape medium MT2 in terms of their generations. It is also assumed that the latter magnetic tape medium MT2 contains some data that is written previously.

Figure 11:
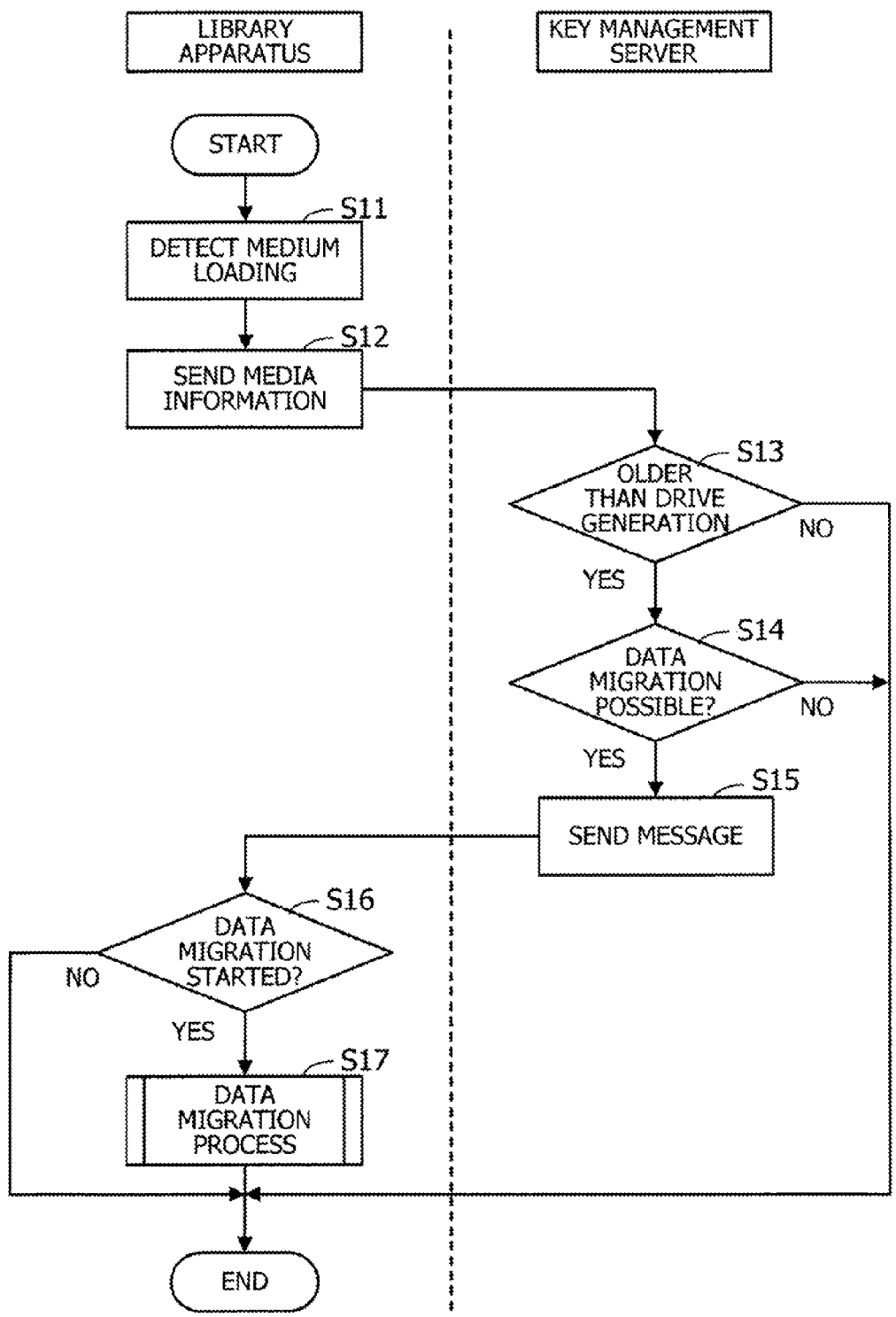
FIG. 11 is a flowchart illustrating a process of checking generations which is executed when a magnetic tape medium is loaded.

FIG. 11 is a flowchart illustrating a procedure of checking generations which is executed when a magnetic tape medium is loaded. Each step of FIG. 11 will now be described below in the order of step numbers.

(Step S11) The library control unit 101 detects loading of a magnetic tape medium MT2 to the CAS 107. As noted above, this magnetic tape medium MT2 contains previously stored data.

(Step S12) The server communication unit 110 informs the key management server 200 of the newly loaded magnetic tape medium MT2.

(Step S13) The supervisory control unit 250 determines whether the generation of the magnetic tape medium MT2 is older than those of drives 104 and 105. If the former is found to be older than the latter (Yes at step S13), the procedure advances to step S14. If not (No at step S13, i.e., if the generation of the magnetic tape medium MT2 is found to be equal to or newer than those of drives 104 and 105), the procedure is terminated. This determination may be made with reference to the foregoing drive management table 221 in the drive information storage unit 220. For example, the supervisory control unit 250 may be able to consult the drive management table 221 by sending queries to the drive management unit 260.

(Step S14) The supervisory control unit 250 determines whether it is possible to perform data migration, i.e., to copy the stored data in the magnetic tape medium MT2 to another magnetic tape medium MT1 of a newer generation. This determination yields a positive result when both of the following two conditions are met:

(1) There is a drive that belongs to a generation capable of reading data from the magnetic tape medium MT2 in question.

(2) Data migration has not yet been performed on the magnetic tape medium MT2 in question.

These conditions may be tested with reference to a generation compatibility table 211 stored in the compatibility information storage unit 210, as well as to a media management table 231 stored in the media information storage unit 230. If it is possible to perform data migration (Yes at step S14), the procedure advances to step S15. If not (No at step S14), the procedure is terminated.

(Step S15) The supervisory control unit 250 causes the alarm generation unit 290 to generate an alarm indicating that data migration is possible and issue the alarm to the library apparatus 100. When this alarm arrives, the alarm sending unit 140 causes the operation panel 108 to output a message to indicate the possibility of data migration, so that the user is so informed. The alarm may include information such as the generation and location of magnetic tape medium MT2 as the migration source medium. In this case, the operation panel 108 may output those pieces of information for viewing by the user.

(Step S16) The data migration control unit 150 determines whether the operation panel 108 has received a user input that initiates data migration. If such a user input has been received (Yes at step S16), the procedure advances to step S17. If the user is silent (No at step S16), the procedure is terminated.

(Step S17) The data migration control unit 150 migrates data from the source magnetic tape medium MT2 to the target magnetic tape medium MT1.

The above-described steps permit the library apparatus 100 to check the generation of a magnetic tape medium MT2 when it is loaded and, if necessary, try to migrate data to a new-generation magnetic tape medium MT1. This feature of the library apparatus 100 makes it possible to perform data migration from an old magnetic tape medium MT2 to a new-generation magnetic tape medium MT1 before the drive supporting the former medium is removed from the library apparatus 100. The library apparatus 100 also discovers magnetic tape media that belong to an old generation but have not yet been copied on new media. The library apparatus 100 migrates data stored in such magnetic tape media before it is too late.

Figure 12:
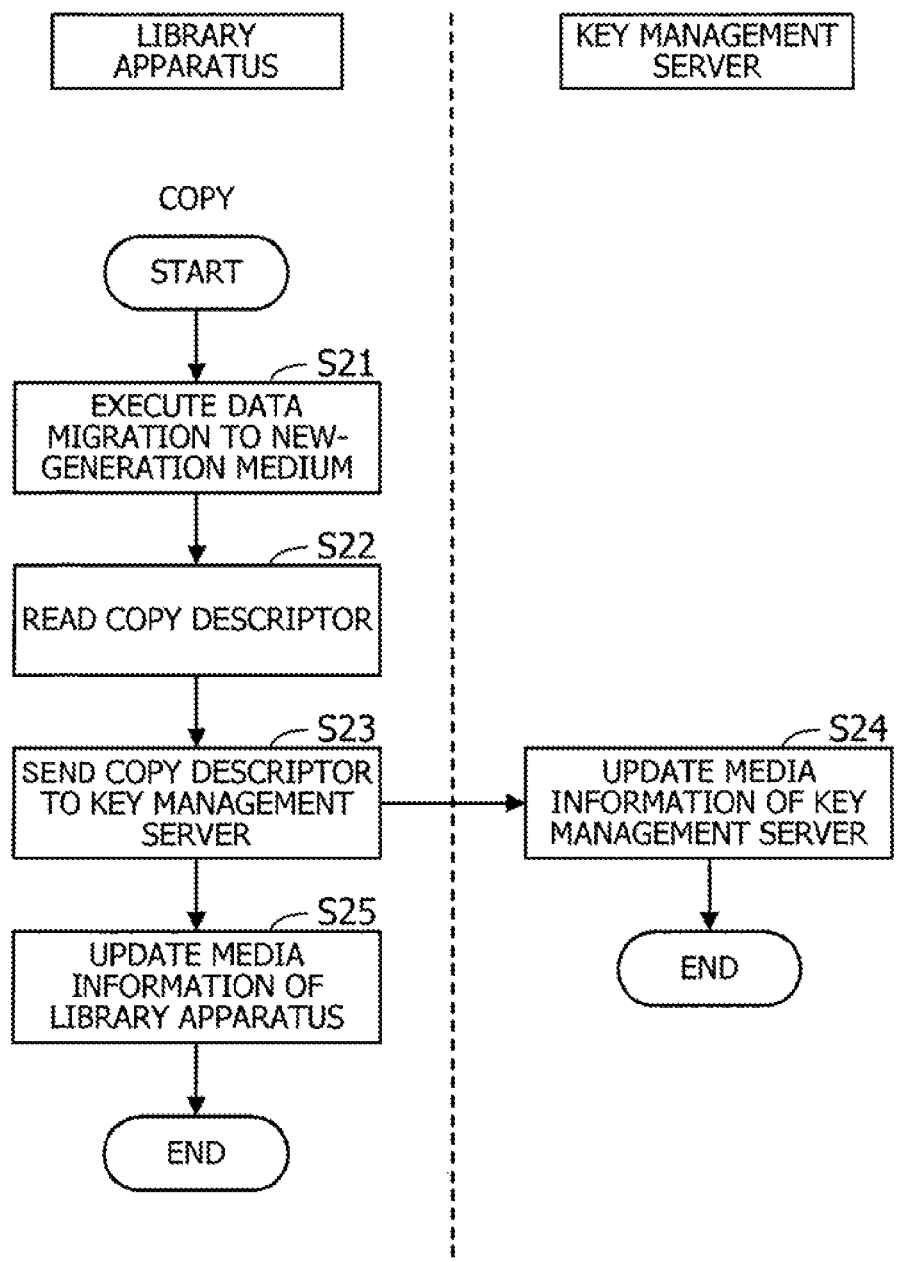
FIG. 12 is a flowchart illustrating a data migration process.

The following section will now describe a more detailed procedure of the data migration at step S17, assuming that the data is copied to a magnetic tape medium MT1. FIG. 12 is a flowchart illustrating such a data migration procedure. Each step of FIG. 12 will now be described below in the order of step numbers.

(Step S21) The data migration control unit 150 controls the transport mechanism 103 in such a way that magnetic tape media MT1 and MT2 are transported to drives 104 and 105, respectively. The data migration control unit 150 then initiates data migration from the source magnetic tape medium MT2 to the destination magnetic tape medium MT1. The data migration control unit 150 also sends a query to the key management server 200 to know whether there are any cryptographic keys assigned for the source magnetic tape medium MT2. In the case where such keys are provided from the key management server 200 in response to the query, the data migration control unit 150 uses those keys in its processing of data migration. For example, the data migration control unit 150 decrypts data read out of the source magnetic tape medium MT2 by using a decryption key and encrypts the resulting plain-text data by using an encryption key before copying the data to the target magnetic tape medium MT1. This encryption key may be newly produced for use with the target magnetic tape medium MT1. It is noted that the data migration control unit 150 may also be configured to migrate the original encrypted data as is. When this is the case, the decryption key for the source magnetic tape medium MT2 is inherited for use with the target magnetic tape medium MT1, so that the copy in the target magnetic tape medium MT1 will be retrieved with the same key.

(Step S22) Upon completion of the above data migration, the data migration control unit 150 produces a copy descriptor for the key management server 200 to keep a record of the data migration in its media management table 231. Specifically, this copy descriptor includes media management IDs representing the source and target magnetic tape media.

(Step S23) The data migration control unit 150 sends the produced copy descriptor to the key management server 200.

(Step S24) Upon receipt of this copy descriptor from the library apparatus 100, the supervisory control unit 250 passes it to the media management unit 270 to update the media management table 231 in the media information storage unit 230. Specifically, the media management unit 270 locates a record relevant to the media management ID of the source magnetic tape medium MT2 and fills out the copy destination field of that record with the received media management ID of the target magnetic tape medium MT1.

(Step S25) The data migration control unit 150 updates media information managed in the library apparatus 100.

The above steps enable the library apparatus 100 to execute data migration from an old-generation magnetic tape medium MT2 to a new-generation magnetic tape medium MT1. The above-described step S21 encrypts data when it is stored in the target magnetic tape medium MT1. The encryption key used in this step S21 may be the one inherited from the magnetic tape medium MT2, or may be newly produced for use with the target magnetic tape medium MT1. In the former case, the key management unit 280 updates its key management table 241 by transferring the original key of the source magnetic tape medium MT2 to a record that is relevant to the media management ID of the target magnetic tape medium MT1. In the latter case, the key management unit 280 produces a new key for the destination magnetic tape medium MT1 and registers the produced key in a record having its media management ID in the key management table 241.

It is noted that the data stored in magnetic tape media may not necessarily be encrypted. Migration of such plain data does not necessitate a query about cryptographic keys such as the one sent at step S21 from the library apparatus 100 to the key management server 200.

The data migration of step S21 may include a substep of saving data from the magnetic tape medium MT2 to some temporary storage, e.g., a hard disk drive on the host computer 300. The saved data is then transferred to the target magnetic tape medium MT1. These operations may actually be executed by a backup application previously installed on the host computer 300. When this is the case, the host computer 300 receives a command from the key management server 200 at step S21, which triggers the backup application to perform data migration equivalent to the one described above for step S21.

As can be seen from the above section, the generation of a magnetic tape medium is checked when it is loaded on the library apparatus 100. The library system then prompts the user to migrate data if the library apparatus 100 finds it necessary to do so for the loaded magnetic tape medium. However, this check-and-prompt action upon loading of magnetic tape media may not always lead to timely data migration. Accordingly, the library system according to the second embodiment further checks the generation of drives when they are replaced, thus increasing the chances of reviewing necessity of data migration. The next section will now describe a control procedure performed upon replacement of drives.

Figure 13:
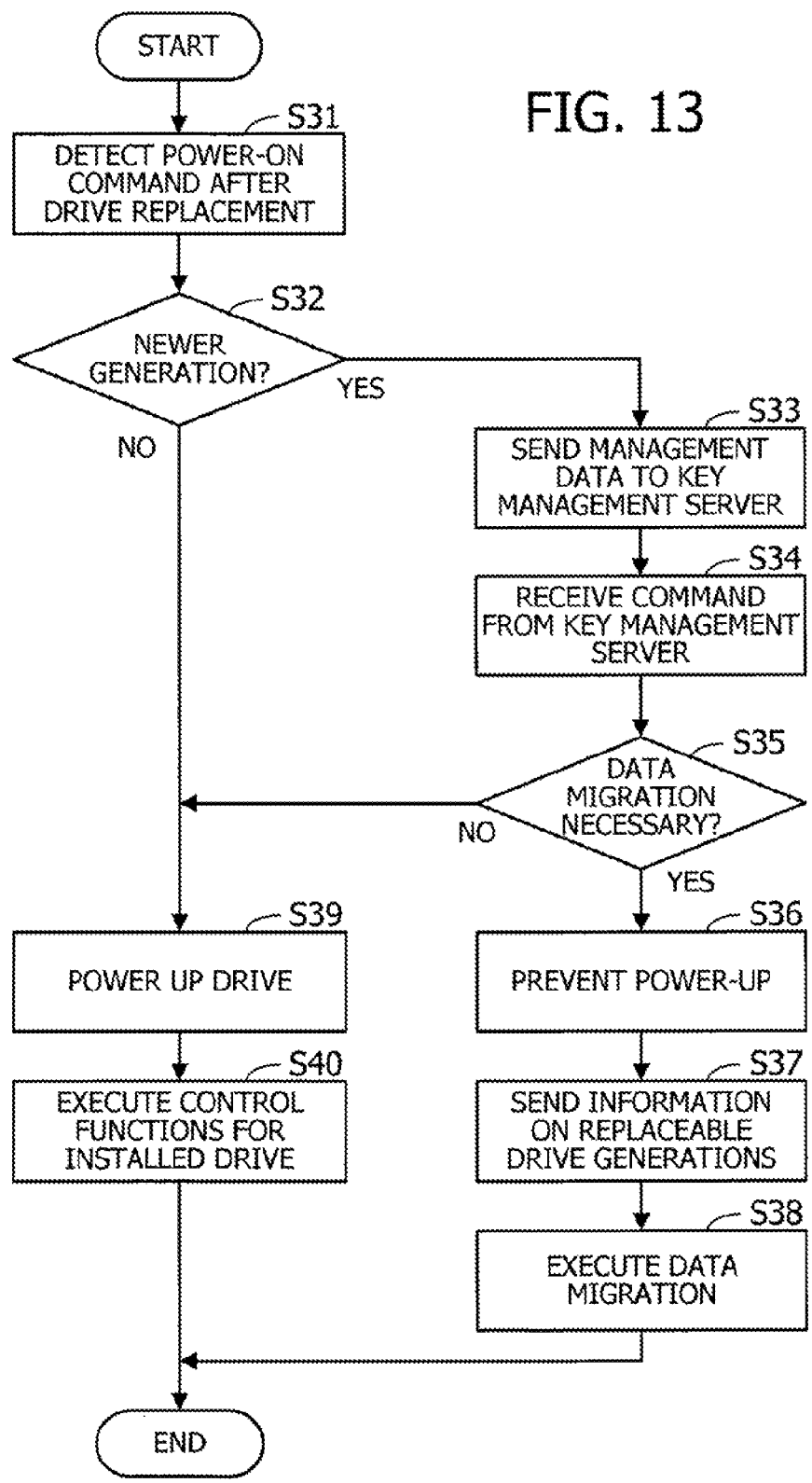
FIG. 13 is a flowchart illustrating an example of how the second embodiment controls replacement of drives.

FIG. 13 is a flowchart illustrating an example of how the second embodiment controls replacement of drives. Each step of FIG. 13 will now be described below in the order of step numbers.

(Step S31) Suppose that an existing drive has been replaced by another drive, and that a power-on command is issued to power up that new drive. The replacement detection unit 120 detects this power-on command. The drive 104 in FIG. 5 now represents the new drive installed in the library apparatus 100.

(Step S32) The replacement detection unit 120 determines whether the drive 104 belongs to a newer generation than the previous drive. If the drive 104 is found to belong to a newer generation (Yes at step S32), the procedure advances to step S33. If not (No at step S32), the procedure proceeds to step S39.

(Step S33) The management data generation unit 130 produces management data concerning the drive 104 and sends it to the key management server 200 via the server communication unit 110. The management data actually includes information that indicates which drive (e.g., Drive0 or Drive1) in the library apparatus 100 has been changed, as well as to what generation the new drive belongs. The management data generation unit 130 may control this production and transmission of management data, depending on the condition of the library apparatus 100. For example, the management data generation unit 130 may be configured to produce and send management data when the quantity of oldest drives in the library apparatus 100 has reached or fallen below a specified number. While not specifically depicted in FIG. 13, the management data generation unit 130 exits from the current control procedure of FIG. 13 when there is no management data to transmit.

(Step S34) The data migration control unit 150 receives a command from the key management server 200 which indicates whether to execute data migration.

(Step S35) The data migration control unit 150 determines whether the command received at step S34 indicates the necessity of data migration. If the command indicates that data migration is necessary (Yes at step S35), the procedure advances to step S36. If not (No at step S35), the procedure proceeds to step S39.

(Step S36) The data migration control unit 150 discards the power-on command received at step S31 and prevents the drive 104 from being powered up. The data migration control unit 150 may be configured to cause the alarm sending unit 140 to send a message indicating that it is not allowed to power up the drive 104.

(Step S37) The alarm sending unit 140 sends a message indicating the generations of replaceable drives (i.e., replacement drives recommended in terms of compatibility). This information has been included in the data migration command. The user may wish to install a new-generation drive. In that case, the user changes the current drive to a drive that belongs to one of the recommended generations and initiates data migration of magnetic tape media from the specified generation to a new generation.

(Step S38) The once-installed new drive 104 is removed and replaced with another drive that has been recommended for replacement. The data migration control unit 150 thus executes data migration to a magnetic tape medium whose generation has been specified by the data migration command. Once the data migration is finished, the user is allowed to reinstall the new-generation drive 104. During the course of data migration, the data migration control unit 150 may send a query to the key management server 200 to obtain keys for use in cryptographic operations on the data. This interaction for cryptographic operations is similar to step S21 of FIG. 12. The data migration control unit 150 then terminates the present procedure.

(Step S39) The data migration control unit 150 powers up the installed drive 104 in response to the power-on command detected at step S31.

(Step S40) The data migration control unit 150 executes some control functions to make the drive 104 operate in the library apparatus 100. For example, the data migration control unit 150 may check whether the drive 104 is operating properly.

The above steps permit the library apparatus 100 to detect replacement of an existing drive by a new drive 104, inform the key management server 200 of the replacement, and prevent the new drive 104 from being powered up when a data migration command is returned from the key management server 200. The key management server 200 may send a data migration command depending on the result of its data migration checking, i.e., determination of whether the magnetic tape array MT in the library apparatus 100 matches with the drives 104 and 105 in terms of compatibility between their generations. The next section will describe how the key management server 200 determines the necessity of data migration.

Figure 14:
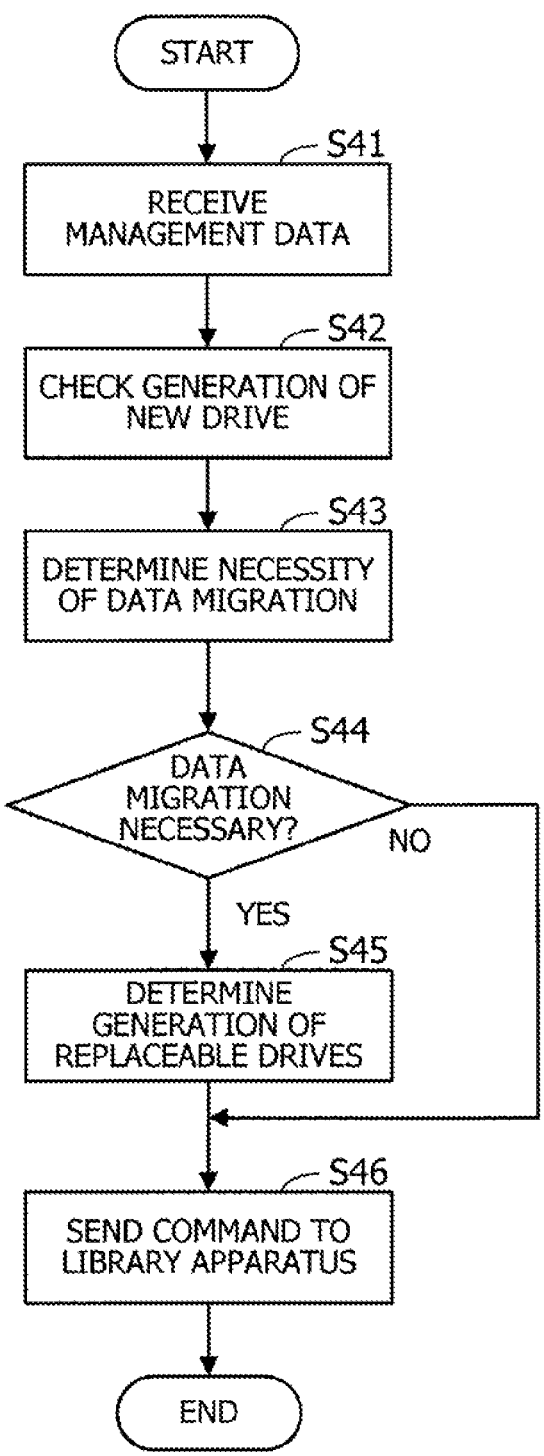
FIG. 14 is a flowchart illustrating a procedure of determining the necessity of data migration.

FIG. 14 is a flowchart illustrating a procedure of determining the necessity of data migration. Each step of FIG. 14 will now be described below in the order of step numbers.

(Step S41) The supervisory control unit 250 receives management data from the library apparatus 100. This management data corresponds to what the management data generation unit 130 produces and sends at step S33 of FIG. 13.

(Step S42) The supervisory control unit 250 determines to which generation the new drive 104 belongs.

(Step S43) The supervisory control unit 250 communicates with the media management unit 270 to obtain the generations of magnetic tape media constituting magnetic tape array MT accommodated in the library apparatus 100. The media management unit 270 may consult a media management table 231 in the media information storage unit 230 to provide the supervisory control unit 250 with information on the generations of magnetic tape media constituting magnetic tape array MT in the library apparatus 100. Here the location of each magnetic tape medium may be determined from the location field of the media management table 231. The supervisory control unit 250 further consults the compatibility information storage unit 210 to determine whether to perform data migration, based on the generations of drives 104 and 105 in comparison with those of magnetic tape media constituting magnetic tape array MT in the library apparatus 100.

(Step S44) The supervisory control unit 250 determines the necessity of data migration. If data migration is found to be necessary (Yes at step S44), the procedure advances to step S45. If no data migration is necessary (No at step S44), the procedure skips to step S46. More specifically, the supervisory control unit 250 finds data migration to be necessary when the magnetic tape array MT includes magnetic tape media whose data has become unreadable with the drives 104 and 105 as a result of the replacement. The supervisory control unit 250 specifies the generation of such magnetic tape media as a target generation for data migration. When, on the other hand, no magnetic tape media in the magnetic tape array MT is unreadable, the supervisory control unit 250 determines that no data migration is necessary.

(Step S45) The supervisory control unit 250 determines the generation of replaceable drives. For example, the supervisory control unit 250 may seek magnetic tape media of the oldest generation in the magnetic tape array MT and then figure out which drives support reading of those oldest-generation media. If such drives are found, the supervisory control unit 250 regards their generation as the generation of replaceable drives.

(Step S46) The supervisory control unit 250 produces a command about data migration and sends it back to the library apparatus 100. Specifically, the supervisory control unit 250 produces and sends a data migration command including information about the generation of replaceable drives when data migration is found to be necessary at step S44. This data migration command also carries information specifying the media management IDs of magnetic tape media to be subjected to data migration. When, on the other hand, step S44 has seen no necessity for data migration, the supervisory control unit 250 sends instead a command that indicates no necessity of data migration, for example. Note that the command produced at this step S46 corresponds to what the library apparatus 100 receives at step S34 of FIG. 13.

The above-described steps permit the key management server 200 to check the generations of drives and magnetic tape media upon replacement of drives. The determination of data migration at step S44 may be implemented in various ways. In the above example, the supervisory control unit 250 determines that data migration is necessary when some magnetic tape media in the library apparatus 100 would be unreadable as a result of replacement of drives. Each of the following conditions may also necessitate data migration in the library apparatus 100:

(1) when the number of magnetic tape media of the oldest-generation equals or exceeds a certain threshold;

(2) when the number of oldest-generation magnetic tape media that can be read with the current drives equals or exceeds a certain threshold;

(3) when the number of magnetic tape media that will reach their expiration dates in a predetermined time (e.g., six months) equals or exceeds a certain threshold;

(4) when the number of oldest-generation drives equals or exceeds a certain threshold;

(5) when the number of existing drives (including those not to be replaced) that can read oldest-generation magnetic tape media equals or falls below a certain threshold; and (6) when the total number of current-generation drives in stock, managed by the component management apparatus 500, equals or falls below a certain threshold, where the thresholds may previously been registered in the key management server 200, with the values appropriate for respective conditions (1) to (6).

The above conditions may further be modified such that the number of magnetic tape media or drives will include, not only those of the library apparatus 100, but also other library apparatuses 100a, and 100b. For example, the supervisory control unit 250 determines which magnetic tape mediums belong to the oldest generation of all those accommodated in the library apparatuses 100, 100a, and 100b. The supervisory control unit 250 then counts such oldest-generation magnetic tape media to evaluate their quantity in comparison with a specified threshold. For another example, the supervisory control unit 250 determines which drives belong to the oldest generation of all those mounted on the library apparatuses 100, 100a, and 100b. The supervisory control unit 250 then counts such oldest-generation drives to evaluate their quantity in comparison with a specified threshold.

Figure 15:
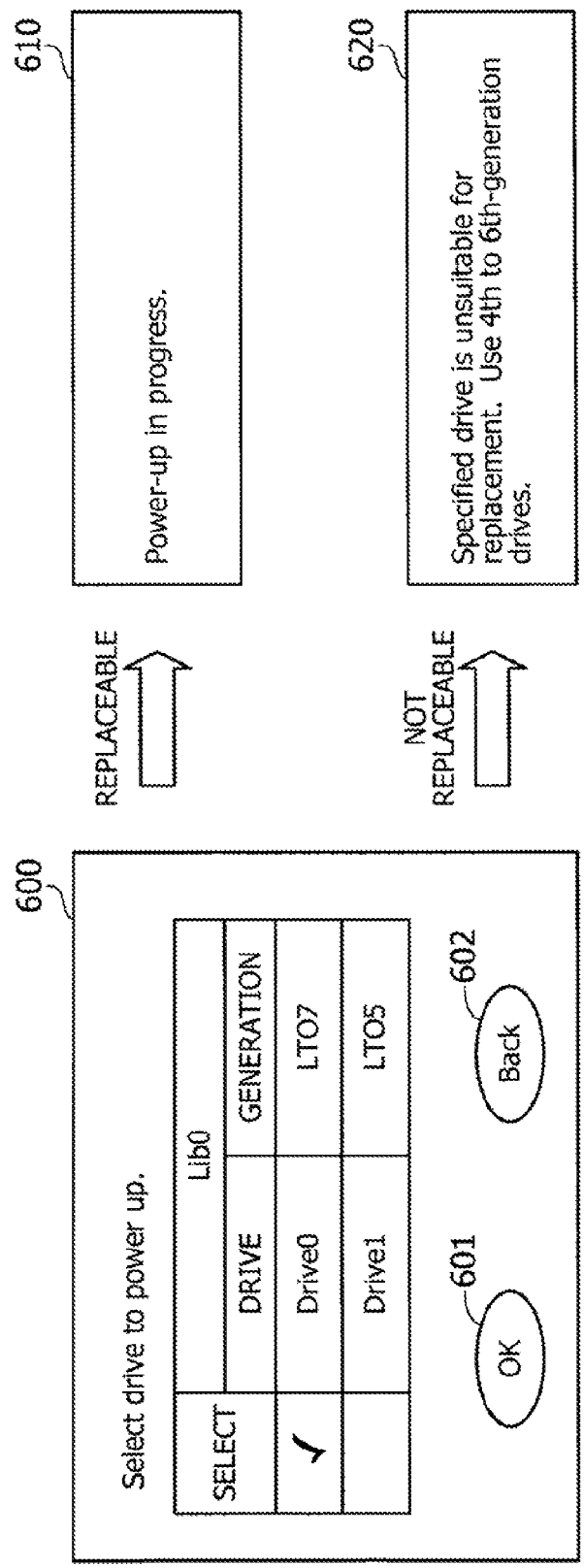
FIG. 15 illustrates example screenshots of an operation panel when some drives have been replaced.

When replacement of drives is restricted, the user may be notified of that fact in the following ways. FIG. 15 illustrates example screenshots of an operation panel when some drives have been replaced. Screens 600, 610, and 620 represent what the user sees on a display screen of the operation panel 108. Specifically, the first screen 600 corresponds to the output of step S31 discussed in FIG. 13. This first screen 600 includes two buttons 601 and 602. The user is allowed to select a specific drive on the first screen 600 (see the check mark). The left button 601, when pressed, causes a power-on command for the selected drive to go to the library apparatus 100. The right button 602, on the other hand, allows the user to go back to a previous menu screen.

The second screen 610 corresponds to the output of step S39 discussed in FIG. 13. For example, the second screen 610 gives a message that says "Power-up in progress." That is, the library apparatus 100 indicates that a power-up procedure is being executed for the selected drive according to the power-on command issued after replacement.

The third screen 620 corresponds to the output of step S37 discussed in FIG. 13. For example, the third screen 620 gives a message that says "Specified drive is unsuitable for replacement. Use 4th to 6th-generation drives." In this way, the library apparatus 100 restricts the new drive from being powered up, while prompting the user to change that drive.

As can be seen from the above, the library system according to the second embodiment restricts the use of a new drive installed in place of an existing drive in the library apparatus 100 in the case where the replacement has resulted in (or would result in) unreadable magnetic tape media in the library apparatus 100. This feature of the second embodiment ensures the capability of reading data from old-generation magnetic tape media after replacement of drives. Ensuring the data reading capability also means that the data can be updated and written into other magnetic tape media of a new generation.

The second embodiment prevents a library apparatus from missing the chance of data migration and thus falling into difficulties in which some old-generation magnetic tape media become unreadable and unrestorable. The proposed generation management of magnetic tape media and drives may be applied to not only a single library apparatus 100, but all the library apparatuses 100, 100a, and 100b as a whole. This system-level generation management prevents backup data from becoming unrestorable.

The above-described procedure determines whether to execute data migration by checking the generations of magnetic tape media and drives after replacement of drives.

This procedure may be modified to perform the checking of generations before drives are actually replaced. The next section will describe this modified version of the second embodiment. It is assumed here that the user enters a replace command to the library apparatus 100 through the operation panel 108 before replacing an existing drive. This replace command includes information specifying the generation of a new drive for replacement. Such replace commands may also be received from the host computer 300 or management terminal 400.

Figure 16:
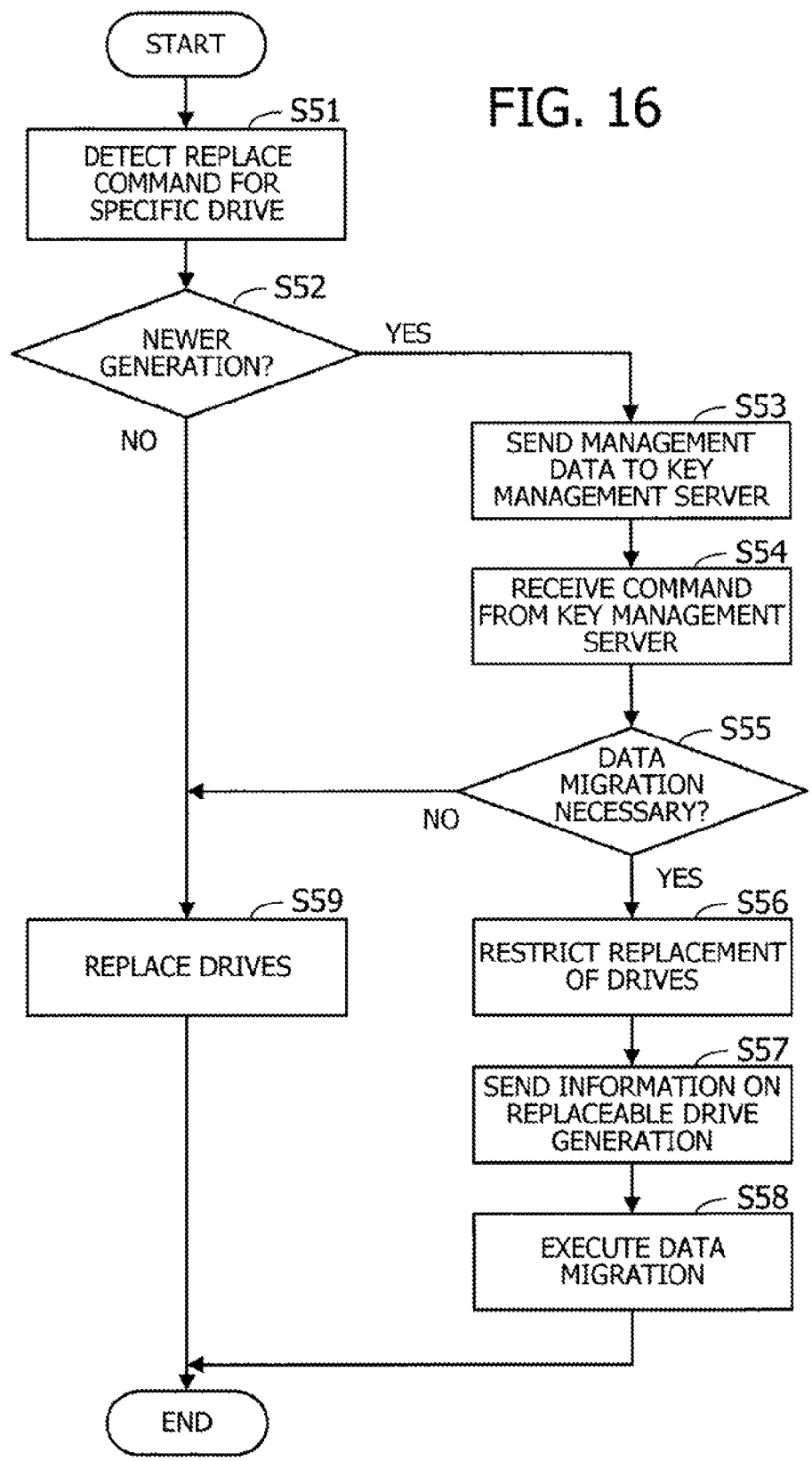
FIG. 16 is a flowchart illustrating another example of how the second embodiment controls replacement of drives;
}

FIG. 16 is a flowchart illustrating another example of how the second embodiment controls replacement of drives. Each step of FIG. 16 will now be described below in the order of step numbers.

(Step S51) The replacement detection unit 120 detects entry of a replace command for a specific drive 104 in the library apparatus 100.

(Step S52) The replacement detection unit 120 determines whether the specified replacement drive belongs to a newer generation than the current drive. When the replacement drive is found to be a newer-generation drive (Yes at step S52), the procedure proceeds to step S53. If not (No at step S52), the procedure advances to step S59.

(Step S53) The management data generation unit 130 produces management data concerning the drive 104 and sends it to the key management server 200 via the server communication unit 110. The management data includes information that indicates which drive (e.g., Drive0 or Drive1) in the library apparatus 100 is to be changed, as well as of what generation the new drive is. When the management data suggests the necessity of data migration, the supervisory control unit 250 in the key management server 200 sends a data migration command back to the library apparatus 100, including an instruction to restrict replacement of drives. When the management data indicates no necessity of data migration, the supervisory control unit 250 informs the library apparatus 100 that there is no need for changing the replacement drive.

(Step S54) The data migration control unit 150 receives a command from the key management server 200 which indicates whether to execute data migration.

(Step S55) The data migration control unit 150 determines whether the command received at step S54 indicates that data migration is necessary. If the command indicates that data migration is necessary (Yes at step S55), the procedure advances to step S56. If not (No at step S55), the procedure proceeds to step S59.

(Step S56) The data migration control unit 150 discards the replace command received at step S51, thus restricting replacement of the drive 104. For example, the data migration control unit 150 may lock the current drive 104 in its bay. Another example may be to configure a drive application to restrict its processing for replacement of drives. The data migration control unit 150 may further cause the alarm sending unit 140 to send a message that indicates the restricted drive replacement.

(Step S57) The alarm sending unit 140 sends a message indicating the generations of replaceable drives (i.e., replacement drives recommended in terms of compatibility). This information about replaceable drive generation may have been included in the data migration command. The user may still wish to install a new-generation drive. In that case, the user changes the replacement drive to a drive that belongs to one of the recommended generations and initiates data migration from old-generation media to new-generation media.

(Step S58) By using the drives 104 and 105, the data migration control unit 150 executes data migration of magnetic tape media whose generation are specified in the received data migration command. Upon completion of this data migration, the data migration control unit 150 lifts the restriction of drive replacement and exits from the procedure of FIG. 16.

(Step S59) The data migration control unit 150 goes ahead to execute the replacement of drives. This processing may include, for example, preparatory tasks for removing an existing drive. The processing may also include operation tests after replacement.

The above steps permit the key management server 200 to check the generation of drives and magnetic tape media when a replace command is issued to the library apparatus 100. Replacement of the drive in question is suspended in the case where the replacement would result in unreadable magnetic tape media in the library apparatus 100. As noted above, this feature ensures the capability of reading and writing data on old-generation magnetic tape media after replacement of drives.

The second embodiment prevents a library apparatus from missing the chance of data migration and thus falling into difficulties in which some old-generation magnetic tape media become unreadable and unrestorable. The proposed generation management of magnetic tape media and drives may be applied to not only a single library apparatus 100, but all the library apparatuses 100, 100a, and 100b as a whole. This system-level generation management prevents backup data from becoming unrestorable. Since the generation of drives are checked before replacement, the user can readily proceed to data migration without the need for changing drives. In other words, the proposed feature saves the user time in comparison with the foregoing generation check procedure after replacement of drives.

(c) Third Embodiment

A third embodiment will now be described below. As the third embodiment shares some elements with the second embodiment, the following description focuses on their differences. See the previous section for the common elements.

In the foregoing second embodiment, it is the key management server 200 that manages drive information and media information and determines the necessity of data migration. The determination of data migration may, however, be made by the library apparatuses 100, 100a, and 100b as will be described below in the third embodiment.

FIG. 2 illustrates a total structure of a library system according to the second embodiment. The illustrated total structure of the library system similarly applies to the third embodiment. For details, see the previous description of FIG. 2.

FIG. 3 illustrates a hardware configuration of a library apparatus 100 according to the second embodiment. The illustrated hardware configuration of the library apparatus 100 similarly applies to the third embodiment. For details, see the previous description of FIG. 3. The following description of the third embodiment will use like reference numerals and names for like hardware components.

FIG. 4 illustrates a hardware configuration of a key management server 200 according to the second embodiment. The illustrated hardware configuration of the key management server 200 similarly applies to the third embodiment. For details, see the previous description of FIG. 4. The following description uses the same reference numeral "200" to designate the key management server in the third embodiment. It is noted, however, that the key management server 200 in the third embodiment may only have a key information storage unit 240 and a key management unit 280, out of the elements illustrated in FIG. 6 for the key management server 200 of the second embodiment. In other words, the third embodiment moves the following functions from the key management server 200 to library apparatuses: compatibility information storage unit 210, drive information storage unit 220, media information storage unit 230, supervisory control unit 250, drive management unit 260, media management unit 270, and alarm generation unit 290.

Figure 17:
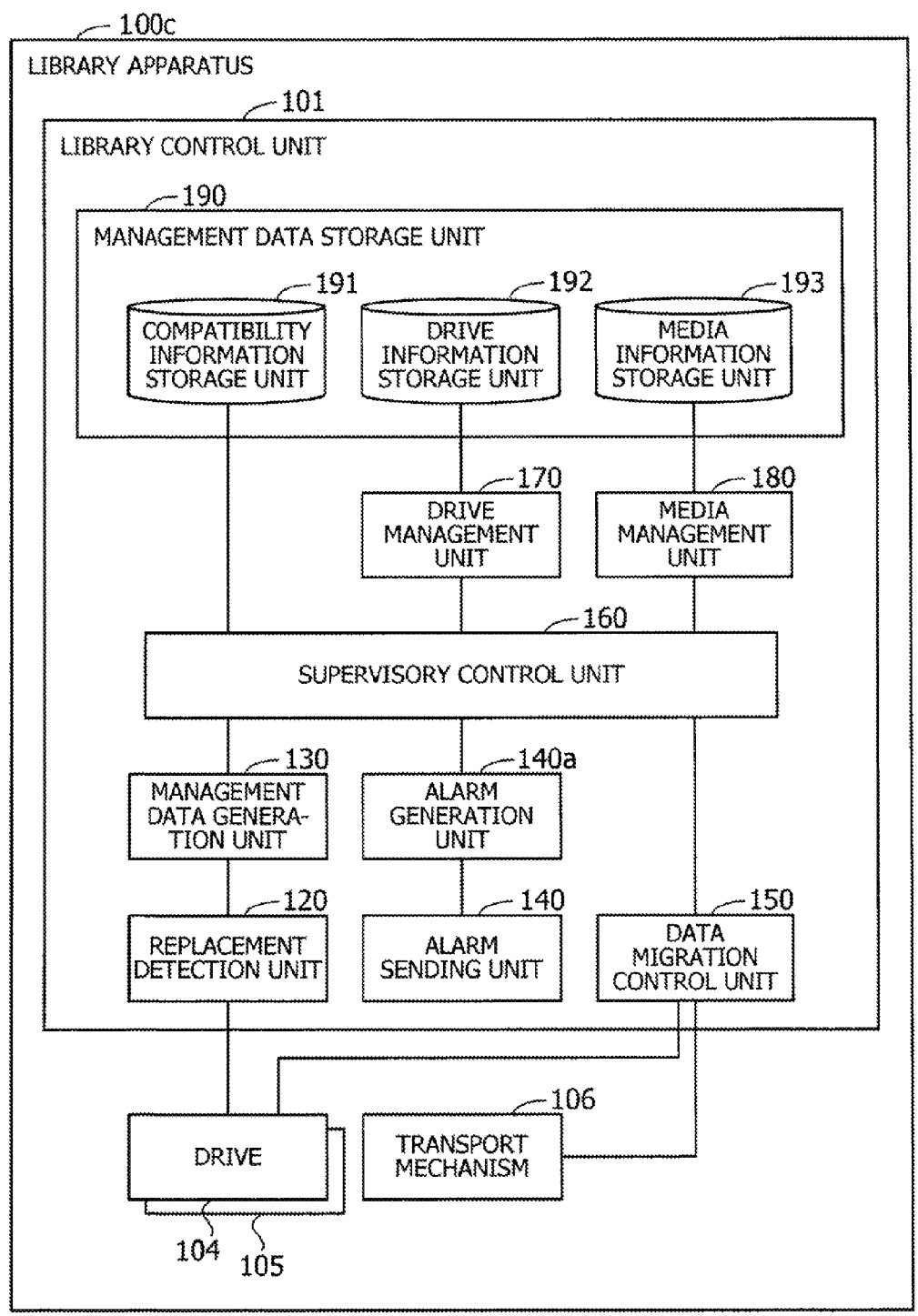
FIG. 17 is a functional block diagram of a library device according to a third embodiment.

FIG. 17 is a functional block diagram of a library device according to the third embodiment. The illustrated library apparatus 100c includes a replacement detection unit 120, a management data generation unit 130, an alarm sending unit 140, an alarm generation unit 140a, a data migration control unit 150, a supervisory control unit 160, a drive management unit 170, a media management unit 180, and a management data storage unit 190. The functions of those components may be implemented on the library apparatus 100c as a computer program(s) executed by the library control unit 101. It may also be possible to implement the whole or part of these functions with dedicated hardware components.

The replacement detection unit 120, management data generation unit 130, alarm sending unit 140, and data migration control unit 150 correspond to their respective counterparts (with the same names and reference numerals) in the library apparatus 100 explained in FIG. 5.

The supervisory control unit 160 in FIG. 17 corresponds to the supervisory control unit 250 described in FIG. 6. When management data is supplied from the management data generation unit 130, the supervisory control unit 160 invokes various control operations for replacement of drives by interacting with the drive management unit 170, media management unit 180, and alarm generation unit 140a.

The drive management unit 170 in FIG. 17 corresponds to the drive management unit 260 described in FIG. 6. The drive management unit 170 manages drives installed in the library apparatus 100c. For example, the drive management unit 170 may receive a query about drives from the supervisory control unit 160. In response, the drive management unit 170 consults the management data storage unit 190 to obtain the number of drives belonging to each generation and sends this information the back to the supervisory control unit 160.

The media management unit 180 in FIG. 17 corresponds to the media management unit 270 described in FIG. 6. The media management unit 180 manages magnetic tape media stored in the library apparatus 100c. For example, the media management unit 180 may receive a query about magnetic tape media from the supervisory control unit 160. In response, the media management unit 180 consults the management data storage unit 190 to obtain the number of magnetic tape media belonging to each generation and sends this information back to the supervisory control unit 160.

The management data storage unit 190 stores various management data. Specifically, the management data storage unit 190 includes a compatibility information storage unit 191, a drive information storage unit 192, and a media information storage unit 193. The compatibility information storage unit 191 in FIG. 17 corresponds to the compatibility information storage unit 210 discussed in FIG. 6. The drive information storage unit 192 in FIG. 17 corresponds to the drive information storage unit 220 discussed in FIG. 6. The media information storage unit 193 in FIG. 17 corresponds to the media information storage unit 230 discussed in FIG. 6. These storage units maintain their respective collections of data as illustrated in FIGS. 7 to 9.

Figure 18:
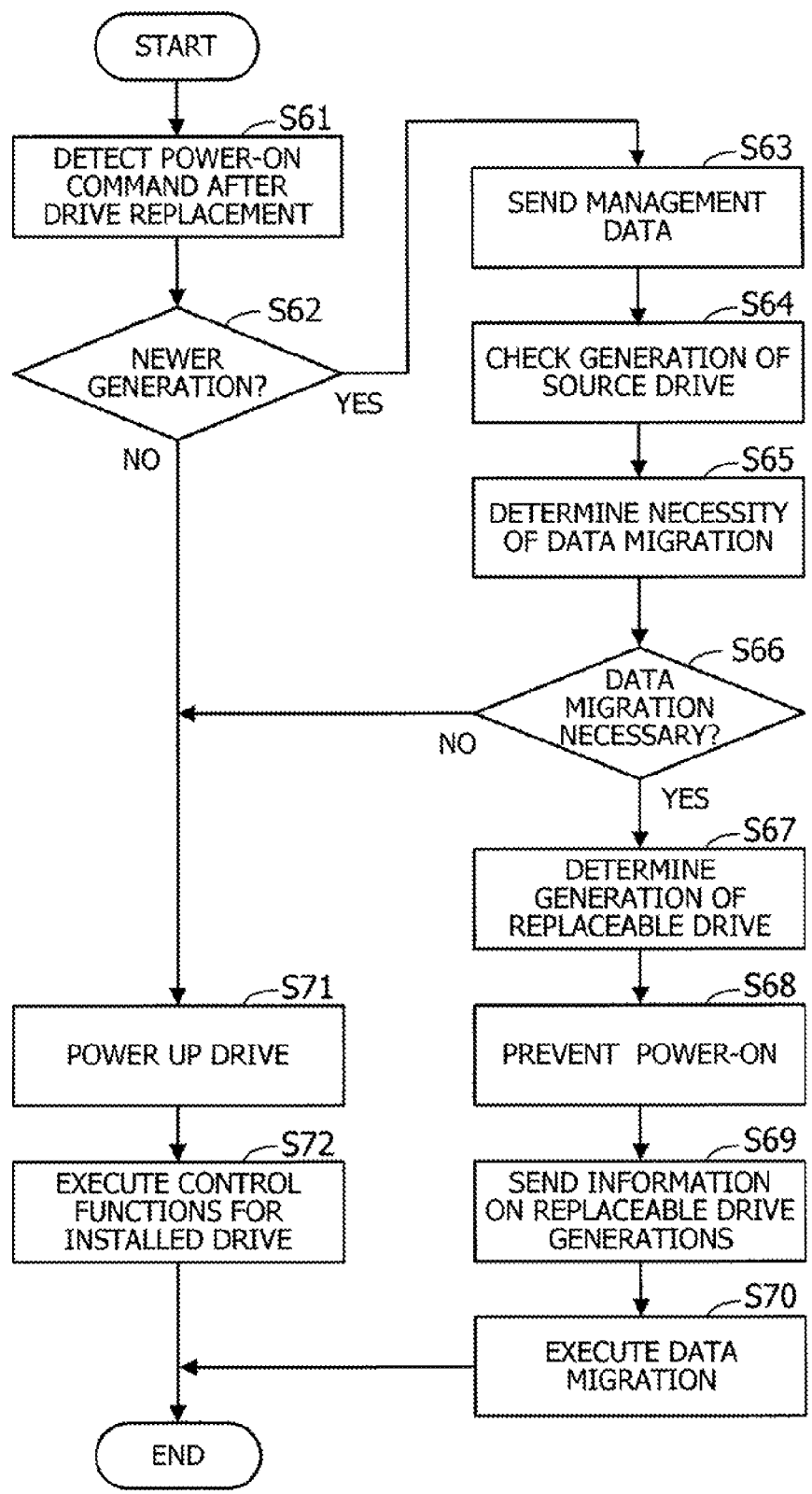
FIG. 18 is a flowchart illustrating an example of how the third embodiment controls replacement of drives.

The above-described library apparatus 100c controls a procedure of drive replacement as follows. FIG. 18 is a flowchart illustrating an example of how the third embodiment operates when a drive is replaced with another one. Each step of FIG. 18 will now be described below in the order of step numbers.

(Step S61) Suppose that an existing drive has been replaced with a new drive, and that a power-on command is issued to power up the new drive. The replacement detection unit 120 detects this power-on command. The drive 104 in FIG. 17 now represents the new drive installed in the library apparatus 100c.

(Step S62) The replacement detection unit 120 determines whether the drive 104 belongs to a newer generation than the previous drive. When the drive 104 is found to belong to a newer generation (Yes at step S62), the procedure advances to step S63. If not (No at step S62), the procedure proceeds to step S71.

(Step S63) The management data generation unit 130 produces management data concerning the drive 104 and passes it to the supervisory control unit 160. The management data includes information that indicates which drive (e.g., Drive0 or Drive1) in the library apparatus 100c has been changed, as well as to what generation the new drive belongs.

(Step S64) The supervisory control unit 160 determines the generation of the new drive 104.

(Step S65) The supervisory control unit 160 communicates with the media management unit 180 to obtain the generations of magnetic tape media that constitute magnetic tape array MT in the library apparatus 100c. The media management unit 180 may search the media information storage unit 193 to provide the supervisory control unit 160 with information on the generations of magnetic tape media of magnetic tape array MT in the library apparatus 100c. The supervisory control unit 160 further searches the compatibility information storage unit 191 to determine whether to perform data migration, based on the generations of drives 104 and 105 in comparison with those of magnetic tape media of magnetic tape array MT in the library apparatus 100c.

(Step S66) The supervisory control unit 160 determines whether data migration is necessary. If data migration is found to be necessary (Yes at step S66), the procedure advances to step S67. If no data migration is necessary (No at step S66), the procedure branches to step S71. More specifically, the supervisory control unit 160 finds data migration to be necessary when the magnetic tape array MT includes a magnetic tape medium whose data is unreadable with the drives 104 and 105 as a result of the replacement. The supervisory control unit 160 specifies the generation of such magnetic tape media as a target generation for data migration. When, on the other hand, no magnetic tape media in the magnetic tape array MT is unreadable, the supervisory control unit 160 determines that no data migration is necessary.

(Step S67) The supervisory control unit 160 determines the generation of replaceable drives. For example, the supervisory control unit 160 may seek magnetic tape media of the oldest generation in the magnetic tape array MT and then figure out which drives support reading of those oldest-generation media. If such drives are found, the supervisory control unit 160 regards their generation as the generation of replaceable drives. The supervisory control unit 160 thus causes the alarm generation unit 140a to produce an alarm message indicating the generation of replaceable drives, so that the alarm sending unit 140 sends out the produced alarm message.

(Step S68) The data migration control unit 150 discards the power-on command received at step S61 and prevents the drive 104 from being powered up. The data migration control unit 150 may be configured to cause the alarm sending unit 140 to send a message indicating that it is not allowed to power up the drive 104.

(Step S69) The alarm sending unit 140 receives the alarm message that the alarm generation unit 140a has produced at step S67 and outputs the message to indicate to the user which drives are suitable for replacement. The user may wish to install a new-generation drive. In that case, the user changes the current drive to a drive that belongs to one of the recommended generations and initiates data migration of magnetic tape media from the specified generation to a new generation.

(Step S70) The once-installed new drive 104 is removed and replaced with another drive that has been recommended for replacement. The data migration control unit 150 thus executes data migration to a magnetic tape medium whose generation has been specified by the data migration command. Upon completion of the data migration, the user is allowed to reinstall the new-generation drive 104. During the course of data migration, the data migration control unit 150 may send a query to the key management server 200 to obtain keys for use in cryptographic operations on the data. This interaction for cryptographic operations is similar to step S21 of FIG. 12. The procedure of FIG. 18 is then terminated.

(Step S71) The data migration control unit 150 powers up the drive 104 in response to the power-on command received at step S61.

(Step S72) The data migration control unit 150 executes some control functions to make the drive 104 operate in the library apparatus 100c. For example, the data migration control unit 150 may check whether the drive 104 is operating properly.

The above steps permit the library apparatus 100c to determine the necessity of data migration upon detection of replacement of drives. When data migration is found to be necessary, the library apparatus 100c prevents the new drive 104 from being powered up.

The determination of data migration at step S66 may be implemented in various ways. Recall, for example, the six conditions (1) to (6) discussed for step S44 of FIG. 14 according to the second embodiment. The same conditions (1) to (6) may be tested at step S66.

As can be seen from the above, the library system according to the third embodiment restricts the use of a new drive installed in place of an existing drive in the library apparatus 100c in the case where the replacement has resulted in (or would result in) unreadable magnetic tape media in the library apparatus 100c. Similarly to the second embodiment, this feature of the third embodiment ensures the capability of reading and writing data on old-generation magnetic tape media after replacement of drives. Ensuring the data reading capability also means that the data can be updated and written into other magnetic tape media of a new generation.

While the above-described process of FIG. 18 has illustrated the case in which the generation of a new drive is checked after replacement, the third embodiment is not limited by that specific example. The third embodiment may also be modified to perform the checking before replacement of drives as in the foregoing second embodiment.

Various embodiments and variations of the proposed library system, management apparatus, library apparatus, management method, and management program have been described above. Those embodiments may prevent existing data storage media from becoming unreadable, thus permitting the user to safely replace drives on a library apparatus.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A library system comprising:
a library apparatus comprising a transport mechanism that transports storage media, and a first drive that reads data from and writes data to a storage medium transported thereto by the transport mechanism, in response to an access request that is received,
wherein the library apparatus performs a first procedure comprising:
sending, upon detection of replacement of the first drive by a second drive, management data describing the replacement of the first drive, and
migrating, in response to a data migration command containing migration source information that specifies a migration source medium, data from the specified migration source medium to another storage medium, based on the migration source information; and
a management apparatus that performs a second procedure comprising:
receiving the management data from the library apparatus,
determining, based on relationships between the management data and the storage media in the library apparatus, which of the storage media is to become unusable for reading or writing or both reading and writing data, and designating the determined storage medium as the migration source medium, and
sending the data migration command containing the migration source media information to the management apparatus to specify the migration source medium that is designated.

2. The library system according to claim 1, wherein:
the management apparatus comprises a memory to store cryptographic keys associated with the storage media for use in encrypting and decrypting data in the storage media; and
the library apparatus obtains, from the management apparatus, one of the keys that is associated with said another storage medium, and uses the obtained key to encrypt data that is to be migrated from the migration source medium to said another storage medium.

3. The library system according to claim 1, wherein:
the library apparatus comprises the first drive in plurality; and
the library apparatus sends management data describing oldest-generation drives that belong to the oldest generation of those in the library apparatus when the number of oldest-generation drives has reached or fallen below a specified threshold.

4. The library system according to claim 1, wherein the library apparatus detects the replacement of the first drive as reception of a replace command from an external apparatus which requests replacement of the first drive, and sends the management data describing the replacement of the first drive based on the received replace command.

5. The library system according to claim 4, wherein the management apparatus commands the library apparatus to restrict the replacement of the first drive when a storage medium is expected to become unusable as a result of execution of the received replace command for the drive.

6. The library system according to claim 1, wherein the management apparatus determines the migration source medium according to information describing expiration dates of the storage media.

7. The library system according to claim 1, wherein:
the management apparatus comprises a memory configured to store location information describing locations of the storage media in the library apparatus; and
the management apparatus uses the location information to determine and designate the migration source medium in the library apparatus.

8. A management apparatus coupled to a library apparatus, the management apparatus comprising:
a transmitter configured to transmit data to the library apparatus;
a receiver configured to receive data from the library apparatus; and
one or more processors configured to perform a procedure comprising:
receiving management data from the library apparatus which describes replacement of a first drive by a second drive;
determining, based on relationships between the management data and storage media in the library apparatus, which of the storage media is to become unusable for reading data or writing data or both reading and writing data, and designating the determined storage medium as the migration source medium; and
sending to the library apparatus a data migration command containing migration source information that specifies the migration source medium, the data migration command requesting migration of data from the specified migration source medium to another storage medium.

9. A library apparatus comprising:
a transport mechanism that transports storage media;
a first drive configured to read data from and write data to a storage medium transported thereto by the transport mechanism, in response to an access request that is received; and
a controller configured to perform a procedure comprising:
sending, upon detection of replacement of the first drive by a second drive, management data describing the replacement of the first drive,
determining, based on relationships between the management data and the storage media, which of the storage media is to become unusable for reading data or writing data or both reading and writing data, and designating the determined storage medium as a migration source medium, and
migrating data from the designated migration source medium to another storage medium.

10. A computer-readable, non-transitory medium encoded with a management program, the management program causing a computer to perform a procedure comprising:
receiving management data from a library apparatus which describes replacement of a first drive by a second drive;
determining, based on relationships between the management data and storage media in the library apparatus, which of the storage media is to become unusable for reading data or writing data or both reading and writing data, and designating the determined storage medium as a migration source medium; and
sending to the library apparatus a data migration command containing migration source information that specifies the migration source medium, the data migration command requesting migration of data from the specified migration source medium to another storage medium.

* * * * *